US012281567B1

(12) United States Patent
Sullivan

(10) Patent No.: US 12,281,567 B1
(45) Date of Patent: Apr. 22, 2025

(54) METHOD FOR DEPTH IDENTIFICATION OF LEAKS IN A CASING STRING

(71) Applicant: Aera Energy LLC, Bakersfield, CA (US)

(72) Inventor: Rickey Sullivan, Bakersfield, CA (US)

(73) Assignee: Aera Energy LLC, Bakersfield, CA (US)

( * ) Notice: Subject to any disclaimer, the term of this patent is extended or adjusted under 35 U.S.C. 154(b) by 0 days.

(21) Appl. No.: 18/906,660

(22) Filed: Oct. 4, 2024

Related U.S. Application Data

(60) Provisional application No. 63/598,846, filed on Nov. 14, 2023.

(51) Int. Cl.
| | |
|---|---|
| *E21B 47/117* | (2012.01) |
| *E21B 47/04* | (2012.01) |
| *E21B 47/07* | (2012.01) |
| *G01K 11/3206* | (2021.01) |
| *G01M 3/00* | (2006.01) |

(52) U.S. Cl.
CPC ............ *E21B 47/117* (2020.05); *E21B 47/04* (2013.01); *E21B 47/07* (2020.05); *G01K 11/3206* (2013.01); *G01M 3/002* (2013.01)

(58) Field of Classification Search
None
See application file for complete search history.

(56) References Cited

U.S. PATENT DOCUMENTS

| | | | |
|---|---|---|---|
| 4,008,755 A * | 2/1977 | Vandamme | G01R 31/343 165/DIG. 8 |
| 7,779,683 B2 | 8/2010 | Glasbergen et al. | |
| 8,788,251 B2 | 7/2014 | Weng et al. | |
| 9,846,103 B2 | 12/2017 | Strong | |
| 10,125,602 B2 | 11/2018 | Al-Hussain et al. | |
| 10,718,206 B2 | 7/2020 | Weng et al. | |
| 10,927,668 B2 | 2/2021 | Iyer et al. | |
| 2003/0015840 A1 * | 1/2003 | Davis | G01M 3/2869 277/320 |
| 2004/0112596 A1 * | 6/2004 | Williams | E21B 47/103 166/250.03 |

(Continued)

FOREIGN PATENT DOCUMENTS

| | | |
|---|---|---|
| CN | 111022038 B | 4/2020 |
| CN | 115288669 A | 11/2022 |

(Continued)

OTHER PUBLICATIONS

WO2021241910A1 translation (Year: 2021).*

*Primary Examiner* — Lina Cordero
(74) *Attorney, Agent, or Firm* — Ralph D Chabot

(57) ABSTRACT

A method for detecting leaks in a casing involves running a fiber-optic distributed temperature sensing cable into a well casing to obtain at least one trace in real time. The method includes thermally conditioning the well by inert gas injection and utilizing a trace to calculate moving average temperature gradients at predetermined intervals, determine the mean and standard deviation of these gradients, and establish a lower control limit based on the mean and standard deviation. By identifying any moving average temperature gradient below the lower control limit, the method enables the determination of the depth associated with leaks in the casing.

29 Claims, 39 Drawing Sheets

(56) References Cited

U.S. PATENT DOCUMENTS

| | | | |
|---|---|---|---|
| 2004/0154380 A1* | 8/2004 | Walker | G01M 3/38 |
| | | | 73/40.5 R |
| 2009/0277248 A1 | 11/2009 | Skibin et al. | |
| 2009/0326826 A1 | 12/2009 | Hull et al. | |
| 2010/0207019 A1 | 8/2010 | Hartog et al. | |
| 2011/0226469 A1 | 9/2011 | Lovell et al. | |
| 2011/0288843 A1 | 11/2011 | Weng et al. | |
| 2014/0290343 A1* | 10/2014 | Kulkarni | G01M 3/002 |
| | | | 73/40.5 R |
| 2023/0220763 A1 | 7/2023 | Jandhyala et al. | |
| 2023/0228186 A1 | 7/2023 | Al-Dhafeeri et al. | |

FOREIGN PATENT DOCUMENTS

| | | | | |
|---|---|---|---|---|
| GB | 2408329 A | * | 5/2005 | E21B 47/065 |
| WO | 2015126929 A1 | | 8/2015 | |
| WO | WO-2021241910 A1 | * | 12/2021 | G01F 1/86 |

* cited by examiner

Test Results

| Well | Hole Count | Actual Hole Depth (FT) | Measured Leak Depth by FO-DTS (FT) | Temperature Drop at Leak (Deg. F) |
|---|---|---|---|---|
| 1 | 1 | 1410 | 1410 | 2 |
| 2 | 2 | 620 | 620 | 4 |
|   | 3 | 930 | 930 | 4 |
| 3 | 4 | 600 | 600 | 4 |
|   | 5 | 655 | 655 | 7 |
|   | 6 | 700 | 700 | 19 |
|   | 7 | 750 | 744 | 10 |
| 4 | 8 | 700 | 700 | 2 |
|   | 9 | 800 | 800 | 5 |
|   | 10 | 900 | 900 | 11 |
| 5 | 11 | 700 | 700 | 6 |
|   | 12 | 800 | 800 | 8 |
|   | 13 | 900 | 900 | 30 |
| 6 | 14 | 700 | 700 | 2 |
|   | 15 | 1250 | 1250 | 4 |
|   | 16 | 1339 | 1339 | 4 |
| 7 | 17 | 1000 | 1000 | 18 |
| 8 | 18 | 1000 | 1000 | 5 |
| 9 | 19 | 1000 | 1000 | 7 |
|   | 20 | 1090 | 1090 | 27 |
| 10 | None | None | None | NA |
| 11 | None | None | None | NA |
| 12 | None | None | None | NA |
| 13 | 21 | 500-795 | 736 | 3 |
| 14 | 22 | 825-978 | 933 | 3 |

*FIG. 1*

Comparison of Fiber Optic Cooldown Method and Conventional Casing Pressure Tests

| Well Name | MASIP (PSI) | Operating Pressure (PSI) | Fiber Optic N2 Cooldown Test | | Conventional CPT |
|---|---|---|---|---|---|
| | | | Test Pressure (PSI) | Hole Depth (FT) | Hole Depth (FT) |
| 10 | 602 | 95 | 329 | None | None |
| 11 | 1000 | 345 | 990 | None | None |
| 12 | 1000 | 165 | 473 | None | None |
| 13 | 715 | 170 | 574 | 736 | 500 - 795 |
| 14 | 850 | 420 | 730 | 933 | 825 - 978 |

FIG. 7

METHOD FOR DEPTH IDENTIFICATION OF LEAKS IN A CASING STRING

FIELD OF THE INVENTION

The present invention generally relates to methods and systems for detecting anomalies in well casings, and more particularly relates to techniques for identifying leaks or damage in casing strings using temperature measurement and statistical analysis of temperature gradients.

BACKGROUND

Identification of damage to the casing string of a well has typically been performed using casing pressure tests. This testing isolates a lower casing well section from the upper portion of the casing string and the upper portion is thereafter pressure tested to identify whether one or more leaks are present which is indicative of casing damage. The cost and well downtime increase if a leak is identified, as it becomes necessary to perform repetitive tests to identify the depth of a leak. Additional leaks increase the complexity, time, and expense of this type of testing.

The traditional methods of identifying casing damage, such as casing pressure tests, have several limitations and drawbacks. One significant challenge is the need for repetitive testing to pinpoint the location of a leak, which can be both time-consuming and costly. Each additional leak identified further complicates the testing process, leading to increased downtime and higher expenses. The conventional approach also involves the use of maintenance or workover rigs, which adds to the overall cost and operational disruption.

If the issues associated with traditional casing pressure testing methods were resolved, the overall expense could be significantly reduced when compared to the cost of a maintenance or workover rig performing pressure testing.

SUMMARY

The disclosure presents a method, system, and computer program product for identification of fluid migration from inside a casing string to the surrounding wellbore and geologic strata. Such fluid migration, alternatively referred to as a leak or leaks, is attributed to damage to the casing wall at one or more depths. This disclosure describes an efficient alternative to the trial-and-error method associated with casing pressure testing. This summary is not intended to limit the scope of the claimed subject matter.

Overall expense can be significantly reduced when compared to the cost of a maintenance or workover rig performing pressure testing. Besides reduced cost, downtime of the well can be as little as four hours versus two to three days. The method, system, and computer program product described can be adapted for use in steam injection wells, producing wells in a steam flood as well as non-steam flood injection wells and production wells.

A. Method

A method for identifying one or more leaks in a casing involves several steps. First, a temperature measurement device is run into the casing of a well to obtain at least one set of temperature-depth data. One example is the use of a fiber-optic distributed temperature sensing (FO-DTS) cable to obtain a trace between two depths of the casing in real time. A trace is a temperature profile or signal generated along the length of the optical fiber. The trace provides a spatially resolved map of temperature data, showing how temperature varies at different points along the fiber. Inert gas is injected to cool the well until the temperatures at different depths temporarily stabilize at levels cooler than before the injection. Stabilization is confirmed by consecutive traces being effectively the same, accounting for de minimis variations. Traces are preferably taken at predetermined time intervals and most preferably once every five minutes. Once a well has been stabilized, the spatially resolved map of temperature data, also referred to herein as temperature-depth data, is used to perform several calculations. First, calculating a series of moving average temperature gradients between the two depths, with a moving average calculated over a window having a value between two and ten feet, preferably in the range of between four feet and six feet, and most preferably five feet and recalculated at pre-determined intervals such as per one-foot but the minimum pre-determined interval is constrained by the capabilities of the measurement device. Next, calculating the mean of the moving average temperature gradients; calculating the standard deviation of the moving average temperature gradients and a lower control limit (LCL) which is equal to the mean minus a multiplier times standard deviation where the multiplier is between 2.0 to 3.1. Finally, the method involves determining the depth associated with any moving average temperature gradient having a value lower than the LCL which is indicative of a leak.

Alternatively, recalculat ion at pre-determined intervals can be between a minimum interval that temperature measurements can be obtained by the temperature measurement device and ten feet.

As used herein, the phrase "thermally conditioning the well" means the temperatures between the depths, because of inert gas injection, have become temporarily stabilized at temperatures cooler than for the condition of the well prior to injection. Thermal conditioning is not a wellbore treatment as inert gas injection does not alter the rate of fluid production from or injected into a reservoir.

The inert gas can be selected from the group consisting of carbon dioxide or nitrogen. The inert gas source is connected to the well production tree as is a truck with a reel of FO-DTS line.

During inert gas injection, pump pressure should be maintained within +/−3% to minimize changes in the thermal properties of the inert gas. The pump pressure should exceed the reservoir pressure of the well but remain below reservoir fracturing pressure.

Thermal conditioning of a well can be determined using two approaches. The first approach is comparison of consecutive traces until no further cooling is observed. Typically, observation is visual. Alternatively, observation can involve an algorithm or use of artificial intelligence (AI) whereby the computer will determine when the well has been thermally conditioned. The second approach is injection of a pre-determined volume of inert gas sufficient for the well to become thermally conditioned. Thereafter, only one trace is necessary for leak analysis. This second method can be used particularly in environments where the volume of inert gas necessary to thermally condition a well is known. One example would be a well in an oilfield environment where the necessary volume of inert gas to be injected is known, based on prior testing of wells having similar depth and casing diameter.

Once thermal conditioning has been determined, the stabilized trace or stabilized set of temperature-depth data can be used for leak analysis and inert gas injection can be discontinued.

The trace or stabilized set of temperature-depth data is used to calculate a series of moving average temperature gradients between the two depths calculated at pre-determined intervals from the stabilized temperature-depth data. The mean of the moving average temperature gradients and the standard deviation of the moving average temperature gradients are also calculated. Thereafter, a LCL is calculated. The depth associated with a moving average temperature gradient having a value below the LCL is indicative of a leak.

Due to the significant amount of data obtained and calculated, it is preferable to generate the results as an image in a graphical format via screen or printout and leak analysis is determined visually by an operator where the depth of a leak is identified as any depth appearing below the LCL. Alternatively, the computer can be programmed to generate a list of the depths at which a moving average temperature gradient is lower than the LCL. Alternatively, a computer can be programmed to generate a chart illustrating the depths at which leaks are present. In some cases, artificial intelligence (AI) can be utilized for determination of whether leaks are present.

The minimum volume of inert gas pumped for a well to be thermally conditioned is dependent upon well characteristics. All gases and liquids existing in the casing are displaced so the casing column is occupied by inert gas. For the well to become thermally conditioned, inert gas is pumped at a rate sufficient to minimize heat transfer effects from the casing, cement, and formation to the inert gas within the wellbore and provide the required test pressure and ensure turbulent flow inside the casing to minimize fingering of inert gas through the liquid.

Inert gas injection provides sufficient pressure within the casing to cause leak-off thru any casing damage present. The gas provides a cooling effect resulting from mass flowrate and expansion of the gas from the higher pressurized casing into the lower pressure strata.

Leak identification requires use of the distributed temperature measurements once the wellbore has been thermally conditioned.

Accurate identification of leaks due to casing damage depends on detecting statistical temperature differentials in the thermal condition temperature profile inside the casing. These temperature differentials are induced by the leak-off and expansion of inert gas exiting casing leaks and/or perforations causing cooling effects at the associated depth of the casing leak. The conditions that allow for identification of the cooling effect inside the casing are attributed to the normal temperature profile of the casing, primary cement, and surrounding formation, versus a cooler profile resulting from inert gas injection.

The casing acts as a large, insulated pipe, with cement providing insulation and the surrounding strata serving as a heat sink. The strata absorbs and retains heat from the natural geothermal gradient and additional heat from the reservoir recovery process. When inert gas is introduced, it effectively cools the inside of the casing, creating the necessary temperature differential for precise leak detection through changes in mass flow rate and gas expansion. Although the above-described method is for use in steam injection wells or producing wells in a steam flood which are typically shallower than 3000 feet, the method and system is also applicable to wells of varying depths.

Another example addresses thermal conditioning of wells not part of a steam flood. Because leak analysis depends on a temperature differential between the wellbore and the inert gas injected, temperatures within the wellbore between the two depths to be tested should be at least 125 deg F. For certain wells, the normal wellbore temperatures may be less than 125 deg F. and require a sufficient volume of heated liquid, so that the wellbore and surrounding strata temperatures between the two depths are at least 125 deg F. prior to inert gas injection. The heated liquid is preferably heated well water.

Another example addresses wells of significant depth; such as wells deeper than 5000 feet. For these wells, instead of using the method for the entire string of casing, a standard casing pressure test could be used to evaluate a significant portion of the shallower depth. If no leaks are identified for the shallower portion, then the described method can be used for testing the deeper portion of the well.

Once the well has been thermally conditioned, the computer uses the stabilized temperature-depth data to make the following calculations:
  a) calculate a series of temperature gradients between the two depths, with a moving average calculated over a window having a value between two and ten feet recalculated at pre-determined intervals between a minimum interval that temperature measurements can be obtained by the temperature measurement device (presently one-foot for the FO-DTS cable described in the Description below) and ten feet;
  b) calculate the mean of the moving average temperature gradients;
  c) calculate the standard deviation of the moving average temperature gradients; and
  d) calculate the LCL using the formula:

$$LCL = X - (M \times S)$$

where X is the mean; M is a multiplier between 2.0-3.1 and most preferably 3.0; and S is the standard deviation.

The moving average for the series of temperature gradients is preferably about five feet and most preferably a five-foot moving average.

The multiplier will differ depending on the type of well tested. The preferred range to use as the multiplier is as follows:
  for steam injection wells: 2.6-3.1;
  for producing wells in a steam flood: 2.3-3.1;
  for non-thermal wells: 2.0-3.1.

A leak is determined to be at the depth associated with a moving average temperature gradient having a value below the LCL.

In some aspects, the techniques described herein relate to a method for identifying one or more leaks in a casing, the method including the steps of: running a temperature measurement device into the casing of a well to obtain temperature-depth data between two depths of the casing in real time; obtaining at least one set of temperature-depth data; thermally conditioning the well; thereafter, using a set of temperature-depth data of the thermally conditioned well to: (a) calculate a series of temperature gradients between the two depths, with a moving average calculated over a window having a value between two and ten feet recalculated at pre-determined intervals between a minimum interval that temperature measurements can be obtained by the temperature measurement device and ten feet; (b) calculate the mean of the moving average temperature gradients; (c) calculate the standard deviation of the moving average temperature gradients; (d) calculate a lower control limit (LCL) using a formula: $LCL = X - (M \times S)$ where X is the mean, M is a multiplier having a value between 2.6-3.1 and S is the standard deviation; and determining the depth associated with any moving average temperature gradient having a value lower than the lower control limit.

In some aspects, the techniques described herein relate to a method for identifying the depth of a leak in the casing string of a well of a steam flood, the method including the steps of: running a fiber-optic distributed temperature sensing (FO-DTS) cable into the casing of a well to obtain more than one trace along the casing string between two depths; pumping a volume of inert gas down the casing string to displace all preceding liquids and gases from the casing string; continue pumping the inert gas at a stabilized surface pressure until no further cooling is observed when comparing consecutive traces; thereafter, using the trace for calculating a series of five-foot moving average temperature gradients between the two depths recalculated every one-foot; calculating the mean of the series of five-foot moving average temperature gradients; calculating the standard deviation of the five-foot moving average temperature gradients; calculating a lower control limit (LCL) defined as: $LCL=X-(M\times S)$ where X is the mean, M is a multiplier having a value between 2.6-3.1 and S is the standard deviation; and determining the depth of any moving average temperature gradient having a value lower than the lower control limit.

In some aspects, the techniques described herein relate to a method for identifying damage to the casing string of a well having perforations for fluid communication with a reservoir, the method including the steps of: positioning a fiber-optic distributed temperature sensing (FO-DTS) cable to acquire a trace between a lower depth and a shallow depth; pumping a sufficient volume of inert gas into the well below the fracture pressure of the reservoir at a constant pumping pressure varying no more than +/−3 percent to temporarily stabilize the temperatures between the lower depth and the shallow depth; thereafter, acquiring the trace; and determining the depth of any damage present in the casing string using the trace.

In some aspects, the techniques described herein relate to a method for identifying one or more leaks in the casing string of a well, the method including the steps of: running a fiber-optic distributed temperature sensing (FO-DTS) cable into the casing of a well to obtain distributed temperature measurements or traces along the casing string between two depths; pumping heated liquid down the casing string to increase the temperature of the casing between the two depths and adjacent strata to at least 125 deg F.; thereafter, injecting a volume of inert gas down the casing string until the distributed temperature measurements or traces have stabilized; using the stabilized distributed temperature measurements or traces for calculating a series of moving average temperature gradients between the two depths calculated at pre-determined intervals; calculating the mean of the moving average temperature gradients; calculating the standard deviation of the moving average temperature gradients; calculating a lower control limit (LCL) defined as: $LCL=X-(M\times S)$ where X is the mean, M is a multiplier having a value between 2.0 and 3.1 and S is the standard deviation; and determining the depth associated with any moving average temperature gradient having a value lower than the lower control limit.

In some aspects, the techniques described herein relate to a method for identifying one or more leaks in a casing, the method including the steps of: running a temperature measurement device into the casing of a well to measure the temperatures between two depths of the casing; injecting a volume of inert gas into the casing to cool and temporarily stabilize the temperatures between the two depths; thereafter, obtaining temperature-depth data between the two depths in real time; using the temperature-depth data for calculating a series of temperature gradients with a moving average calculated over a window having a value between four and six feet recalculated every one foot; calculating the mean of the series of moving average temperature gradients; calculating the standard deviation of the series of moving average temperature gradients; calculating a lower control limit (LCL) defined as: $LCL=X-(M\times S)$ where X is the mean, M is a multiplier having a value between 2.6-3.1 and S is the standard deviation; and determining the depth associated with any moving average temperature gradient having a value lower than the lower control limit.

B. System

One example of a system for identifying the depth of one or more leaks in the casing of a well utilizes at least in part some of the details described in the previous section. This example of a system includes a computer configured to receive distributed temperature measurements between two depths of a well while the well is being injected with an inert gas and, following stabilization of the distributed temperature measurements, the stabilized temperature measurements are used to calculate a series of moving average temperature gradients at pre-determined intervals between the two depths; calculate the mean of the moving average temperature gradients; calculate the standard deviation of the moving average temperature gradients; calculate the LCL according to the formula: $LCL=X-(M\times S)$; and identify the depth of a moving average temperature gradient having a value below the LCL.

Most preferably, the computer generates a graphical presentation referred to herein as a control chart and are preferably displayed on a video display or printout.

In some aspects, the techniques described herein relate to a system for identifying leaks present in a casing string including: a computer configured to: receive temperature-depth data from a fiber optic distributed temperature sensing cable measuring temperatures in a casing string between two depths; continuing to monitor the temperature-depth data until the casing temperatures are stabilized; using the stabilized temperature-depth data for calculating a series of moving average temperature gradients between the two depths at pre-determined intervals; calculating the mean of the moving average temperature gradients; calculating the standard deviation of the moving average temperature gradients; calculating a lower control limit (LCL) according to the formula: $LCL=X-(M\times S)$ where X is the mean, M is a multiplier and S is the standard deviation; and identifying the depth of a moving average temperature gradient having a value below the LCL.

C. Computer Program

One example of a computer program product for identifying one or more leaks utilizes at least in part some of the details described in the preceding Method section. This example of a computer program includes a non-transitory computer readable medium containing computer instructions stored therein for causing a computer processor to perform, the computer program product includes at least one component operable to:

i) receive distributed temperature measurements between two depths of a downhole casing string using a measurement device;

ii) calculate a series of moving average temperature gradients after the distributed temperature measurements have become stabilized, each moving average temperature gradient calculated at pre-determined intervals over a pre-determined length of the casing string based on the temperature-depth data used to create the stabilized temperature profile;

iii) calculate the mean of the moving average temperature gradients;

iv) calculate the standard deviation(S) of the moving average temperature gradients;

v) calculate the LCL using the formula: LCL=X−(M×S); and vi) identify the depth of any moving average temperature gradient below the LCL.

In some aspects, the techniques described herein relate to a computer program product including: a non-transitory computer readable medium containing computer instructions stored therein for causing a computer processor to perform, the computer program product includes at least one component operable to: (i) obtain a stabilized temperature profile inside at least a portion of a downhole casing string using a measurement device which is run from surface to a pre-determined depth; (ii) calculate a series of moving average temperature gradients, each moving average temperature gradient calculated at pre-determined intervals over a pre-determined length of the casing string based on the stabilized temperature profile; (iii) calculate the mean of the moving average temperature gradients; (iv) calculate the standard deviation of the moving average temperature gradients; (v) calculate a lower control limit (LCL) using the formula: LCL=X−(M×S) where X is the mean, M is a multiplier and S is the standard deviation; (vi) identify any moving average temperature gradient below the LCL; and (vii) generate a control chart including the series of moving average temperature gradients and the LCL where M is between 2.0-3.1.

DESCRIPTION OF THE DRAWINGS

FIG. 1 is a listing of the wells tested.

FIG. 7 is a table for Wells 10-14 comparing the measured depth identified by the present disclosure to a conventional casing pressure test (CPT).

DESCRIPTION

The drawings presented herein are for illustrative purposes and the illustrated parts are not necessarily shown in correct proportion or scale.

To prove the validity of the disclosed method and system, fourteen steam injection wells were tested as listed in FIG. 1. Well depths ranged from about 1000 ft-1800 ft. For Wells 1-9, it was necessary to intentionally perforate casing above the production/injection zone to verify leak identification with a single hole of approximately 0.16" entry diameter. Perforations were shot at the specific depths listed in the Actual Hole Depth column in FIG. 1. Wells 10-12 had no perforations above the production/injection zone and each well passed a conventional pressure test (CPT). Wells 13-14 had existing holes and the depths of each were identified using CPT and listed in the Actual Hole Depth column of FIG. 1. All wells tested had a casing baseline temperature of at least 125 deg F. prior to pumping inert nitrogen gas for cooldown and thermal conditioning. Testing occurred between two depths, a lower depth at or above the perforated zone and a shallower depth, which in the case of these tests was surface. FIG. 1 also provides a Measured Hole Depth by Fiber Optic Cooldown column listing the measured depths of leaks identified and a column listing the temperature drop measured for each leak.

Figure 2:
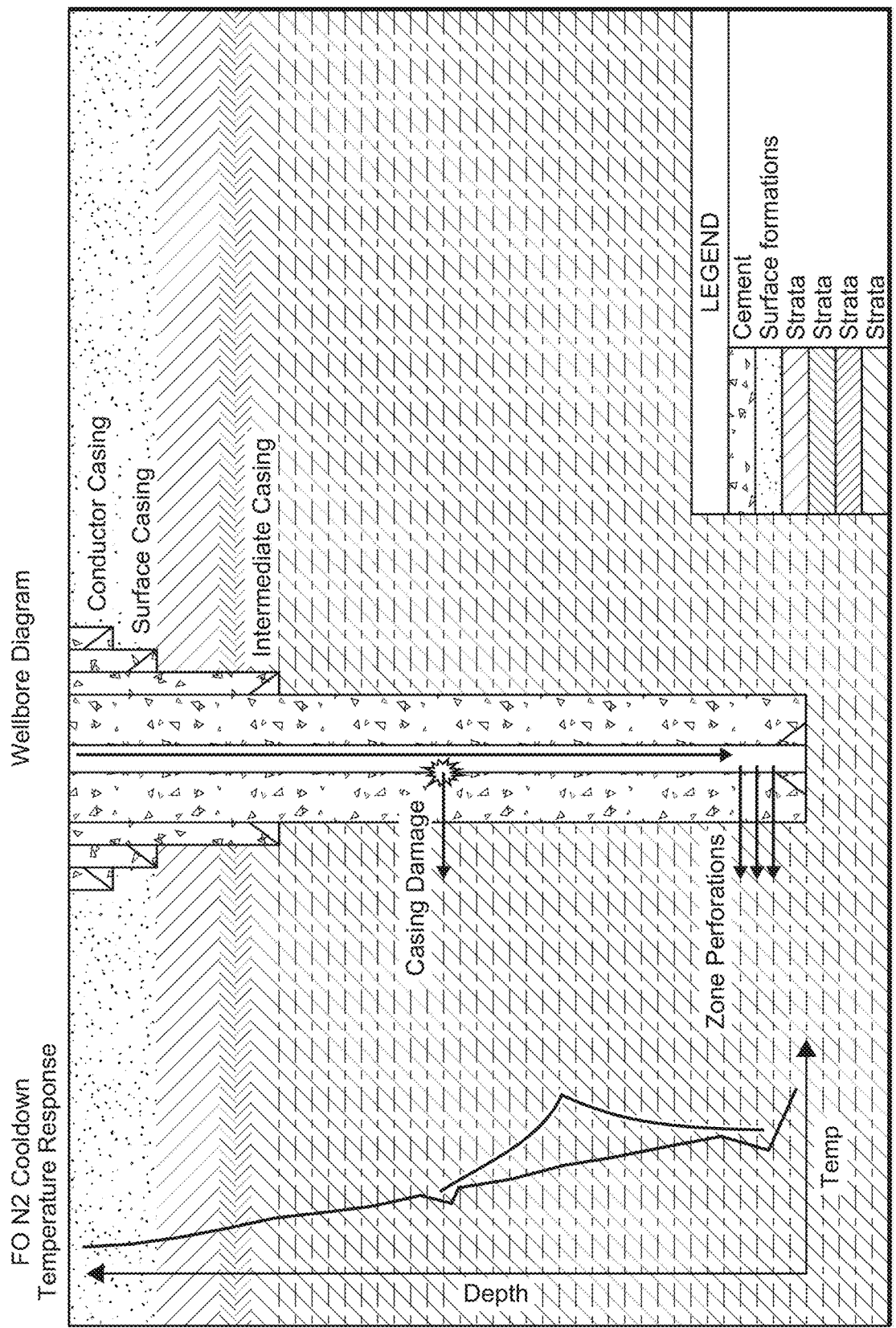
FIG. 2 is a diagram of a typical steam injection well tested.

FIG. 2 is an illustration of a typical casing string configuration for the wells tested with the wellbore arrows indicating the direction of inert gas movement in the well.

One method used to identify the depth of a hole in the casing string above the perforated zone is described as follows.

Figure 3:
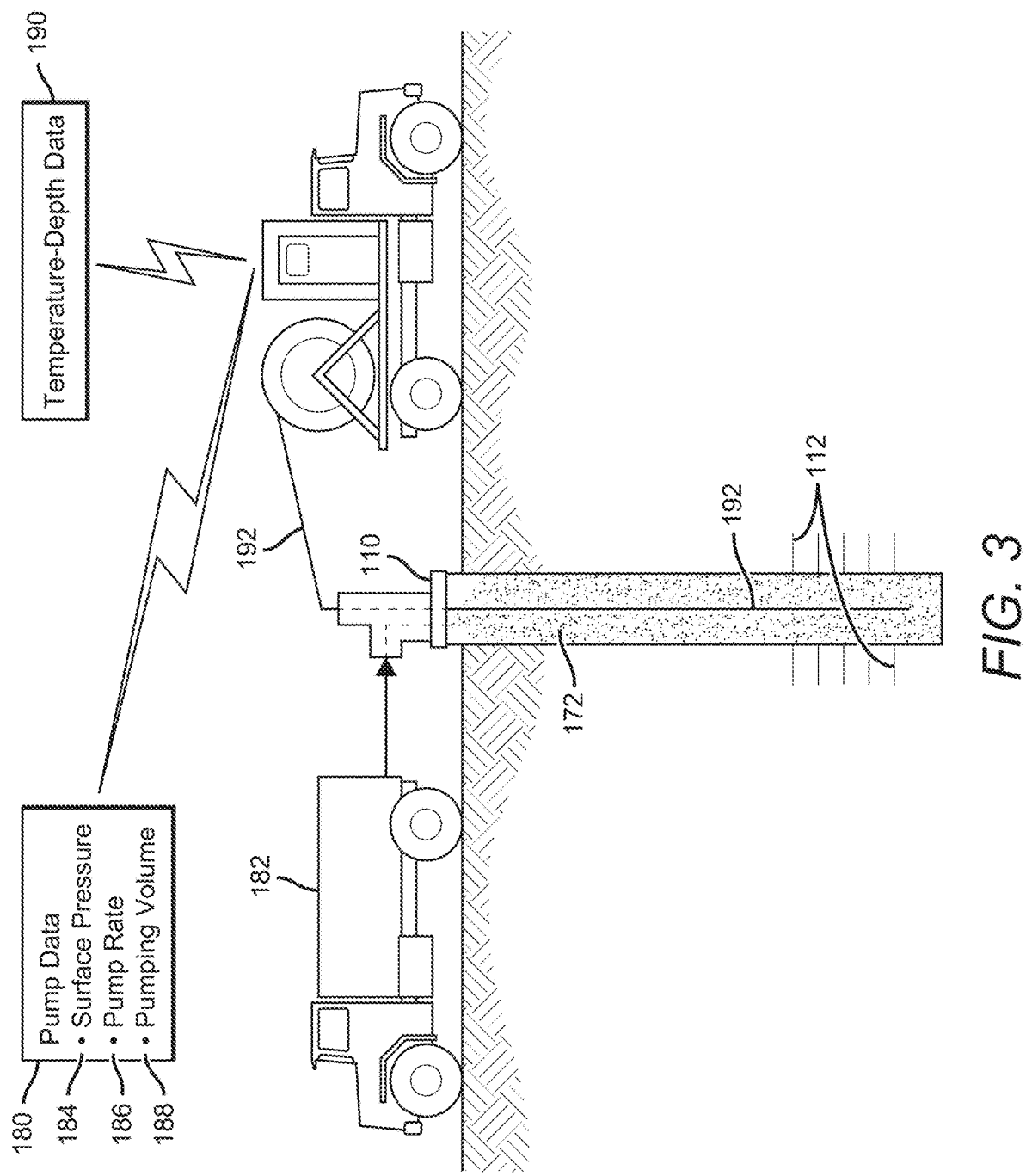
FIG. 3 illustrates the FO-DTS equipment and nitrogen gas pumping equipment operatively connected to a well.

Referring to FIG. 3, operation of a typical steam injection well 110 having downhole perforations 112 into a reservoir is temporarily halted. A fiber-optic distributed temperature sensing (FO-DTS) cable 192 was run from surface into well 110 to the desired depth to acquire traces or distributed temperature measurements i.e., temperature-depth data between surface and a lower depth in real time. Testing occurred in California where government authorities (California Geologic Energy Management Division-CalGEM) required the depth to be no further away than one hundred feet from the top perforation in the reservoir.

A nitrogen gas tanker 182 was connected to well 110 and the nitrogen gas 172 was pumped down the casing of well 110 while pump data 180 is monitored. Pump data 180 includes surface pumping pressure 184, pumping rate 186, and pumping volume 188. Surface pumping pressure 184 is maintained above the well operating pressure and below the reservoir fracture pressure. Pump data 180 is transmitted to a computer 200 where well temperatures provided by FO-DTS cable 192 are also monitored.

The pumping rate is required to be at a rate to at least provide a test pressure above the reservoir operating pressure and below the reservoir's fracturing pressure. Such a pumping rate ensures casing integrity can be confirmed even in a situation if no leaks are identified other than perforations into the productive reservoir. Preferably, a flow rate sufficient for turbulent flow is needed to ensure liquids and gases present in the casing string are fully displaced from the wellbore. Too low of a pump rate could allow fingering of the inert gas through the liquid/gas column. However, the flow rate should not be excessively high to create a fracture in the reservoir.

FIG. 7 shows results for Wells 10-14 comparing the disclosed method to CPT. CPT was performed at or above the maximum allowable surface injection pressure (MASIP).

Respective traces or sets of temperature-depth data 190 from FO-DTS cable 192 was received in real time by computer 200 in five-minute intervals. The first trace was used to generate an image of baseline temperature profile 150 on a video display 222 or printout from printer 226. As nitrogen gas 172 is pumped into the well, surface pumping pressure 184 is maintained within a range of +/−3%. Subsequent traces or sets of temperature-depth data 190 are received from FO-DTS cable 192. Nitrogen injection continues until no further cooling is observed when consecutive traces are compared, and the well is determined to be thermally conditioned. Comparison of the traces when each well is thermally conditioned did show temperature fluctuations of +/−1 Deg F. which was considered de minimis and an acceptable variation to still consider the well temperatures stabilized. Thereafter, the trace of the thermally conditioned well represented by stabilized temperature profile 160 was used for leak analysis.

Figure 8A:
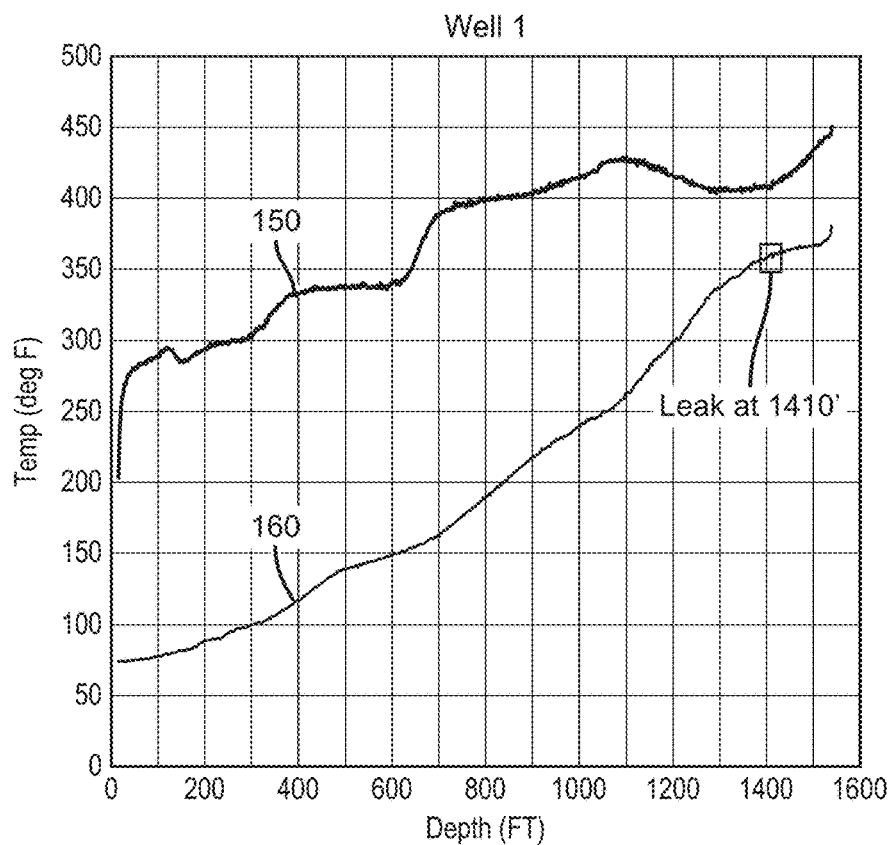
FIG. 8A is a temperature-depth chart using temperature-depth data 190 from Well 1 to generate a baseline temperature profile 150 prior to pumping of nitrogen gas; and a stabilized temperature profile 160 following cooldown and stabilization.

FIG. 8A shows both baseline temperature profile 150 and the stabilized temperature profile 160 for Well 1. Similar baseline temperature profile 150 and stabilized temperature profile 160 are shown for Wells 2-14 in FIGS. 9A, 10A, 10D, 11A, 12A, 13A, 14A, 15A and 16A. Visual observation of either profile is unable to render a determination of the depth at which a leak is present. Further use of the temperature-depth data 190 used to generate stabilized temperature profile 160 is required in subsequent calculations for determination of whether one or more leaks are present and location above the perforated zone of a reservoir.

Figure 8B:
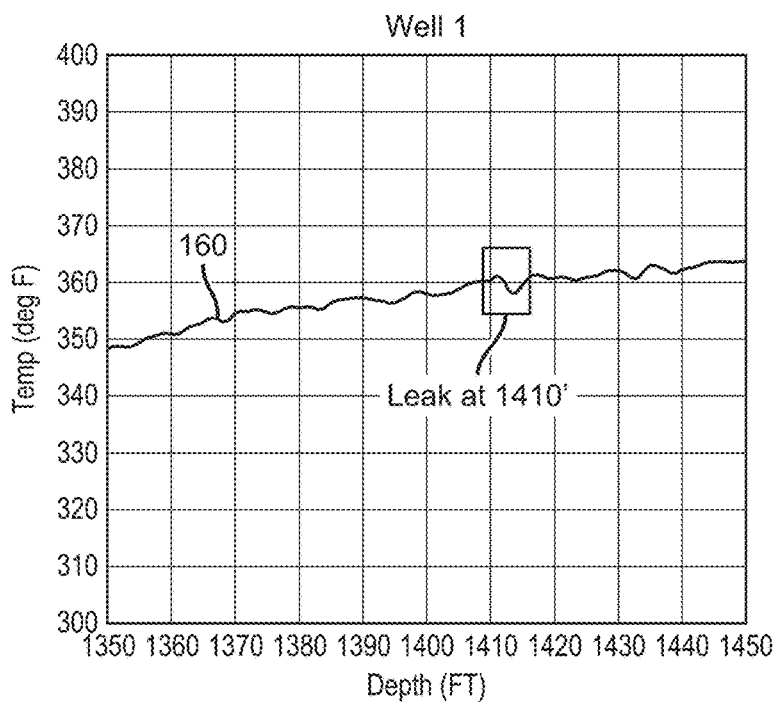
FIG. 8B is an exploded view of the stabilized temperature profile 160 of Well 1 appearing in FIG. 8A.

FIG. 8B is an exploded view of a portion of the stabilized temperature profile 160 of Well 1 focused about the rectangle appearing in FIG. 8A. Exploded views of stabilized temperature profiles 160 are illustrated for Wells 2-14 respectively in the following figures: FIGS. 9B, 10B, 10E, 11B, 12B, 13B, 14B, 15B, 16B, 20B, and 21B.

Figure 8C:
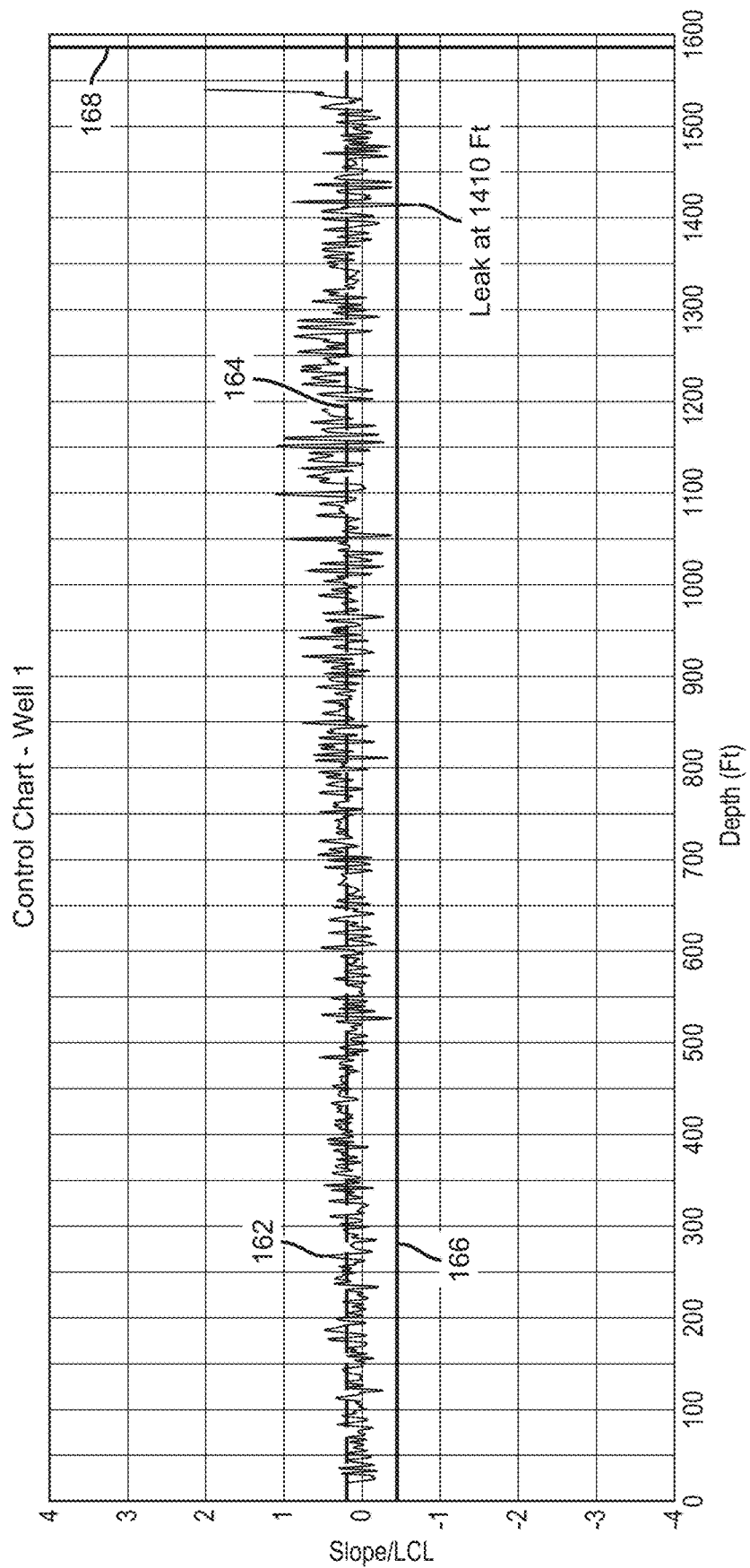
FIG. 8C is a control chart generated from the data used to generate stabilized temperature profile 160 of Well 1.
Figure 9A:
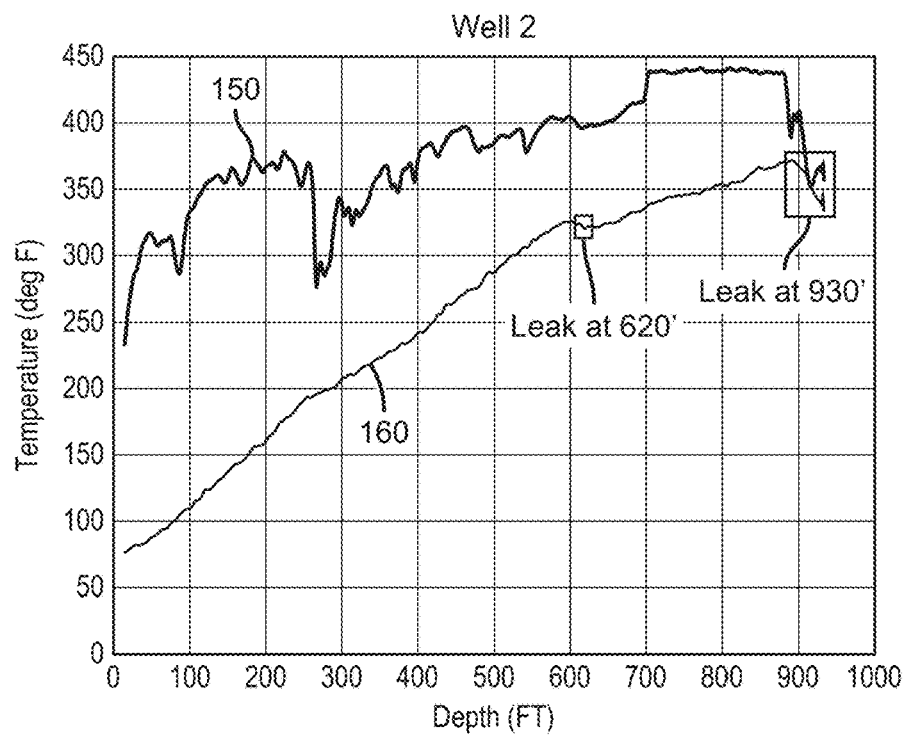
FIG. 9A is a temperature-depth chart using temperature-depth data 190 from Well 2 to generate a baseline temperature profile 150 prior to pumping of nitrogen gas; and a stabilized temperature profile 160 following cooldown and stabilization.
Figure 9B:
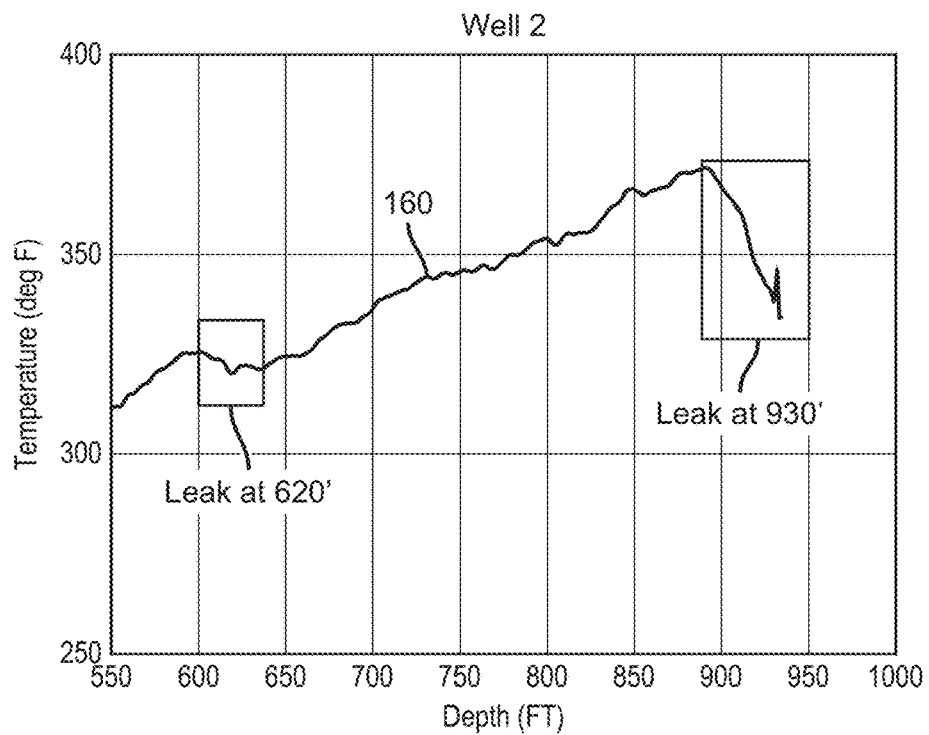
FIG. 9B is an exploded view of the stabilized temperature profile 160 of Well 2 appearing in FIG. 9A.
Figure 9C:
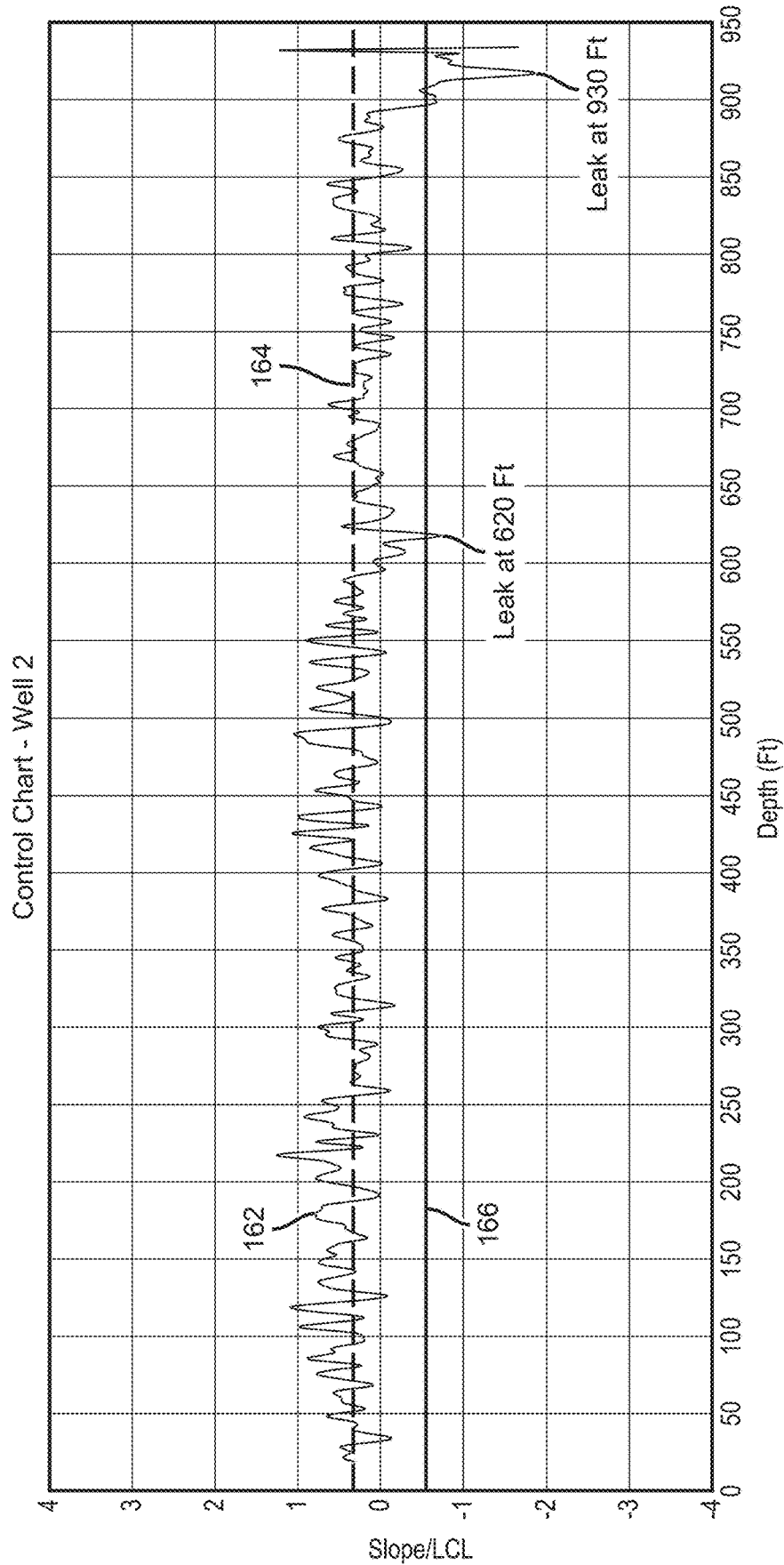
FIG. 9C is a control chart generated from the data used to generate stabilized temperature profile 160 of Well 2.
Figure 10A:
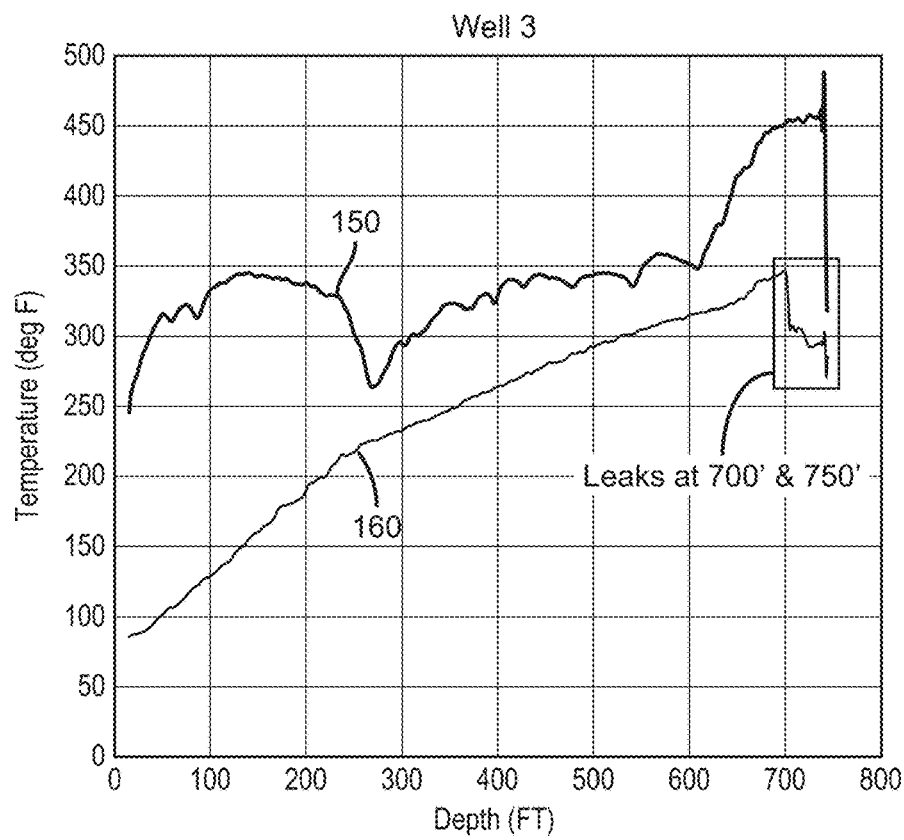
FIG. 10A is a temperature-depth chart using temperature-depth data 190 from a portion of Well 3 to generate a baseline temperature profile 150 prior to pumping of nitrogen gas; and a stabilized temperature profile 160 following cooldown and stabilization.
Figure 10B:
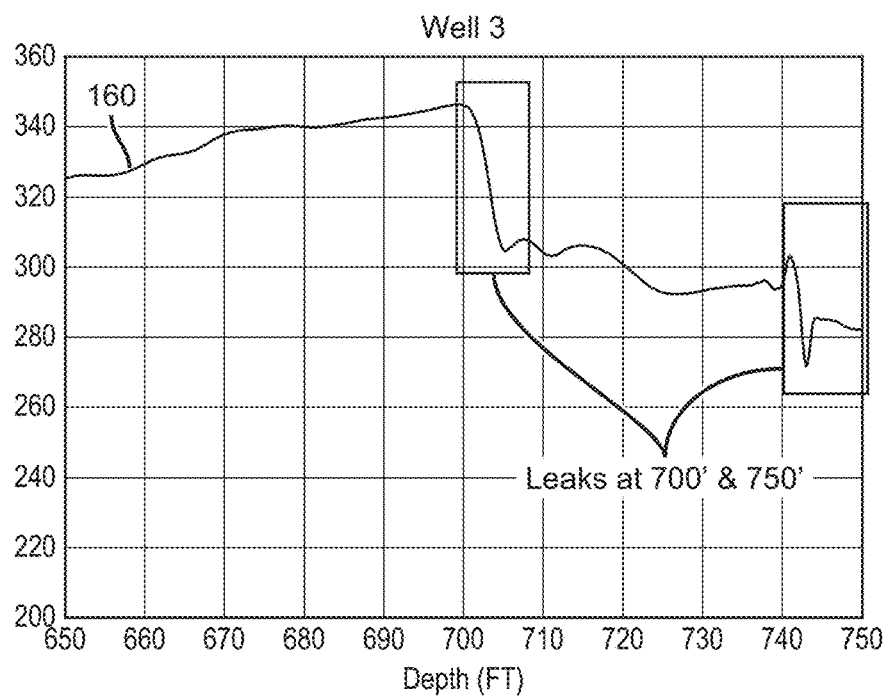
FIG. 10B is an exploded view of the stabilized temperature profile 160 of Well 3 appearing in FIG. 10A.
Figure 10C:
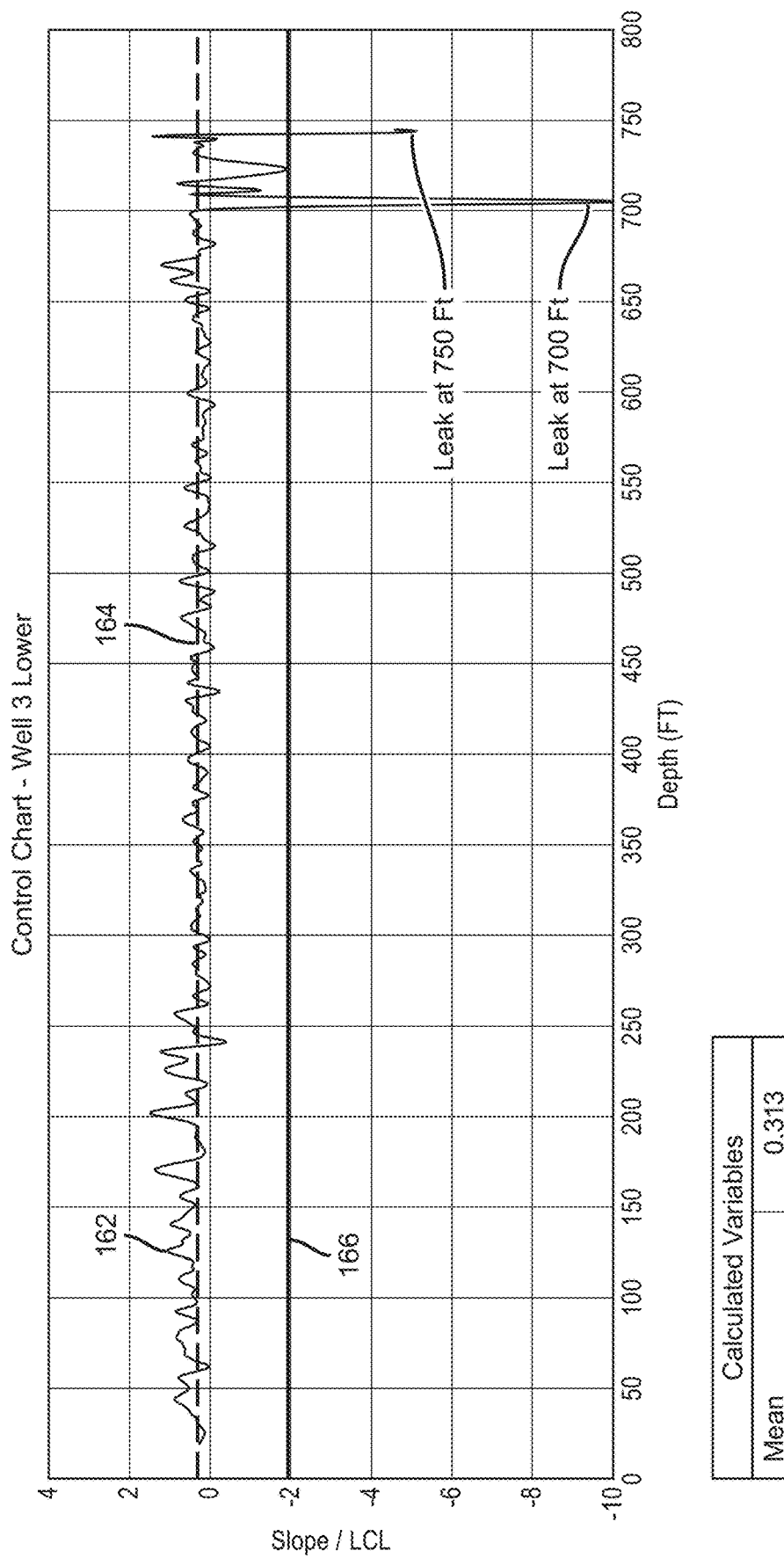
FIG. 10C is a control chart generated from the data used to generate stabilized temperature profile 160 of Well 3.
Figure 10D:
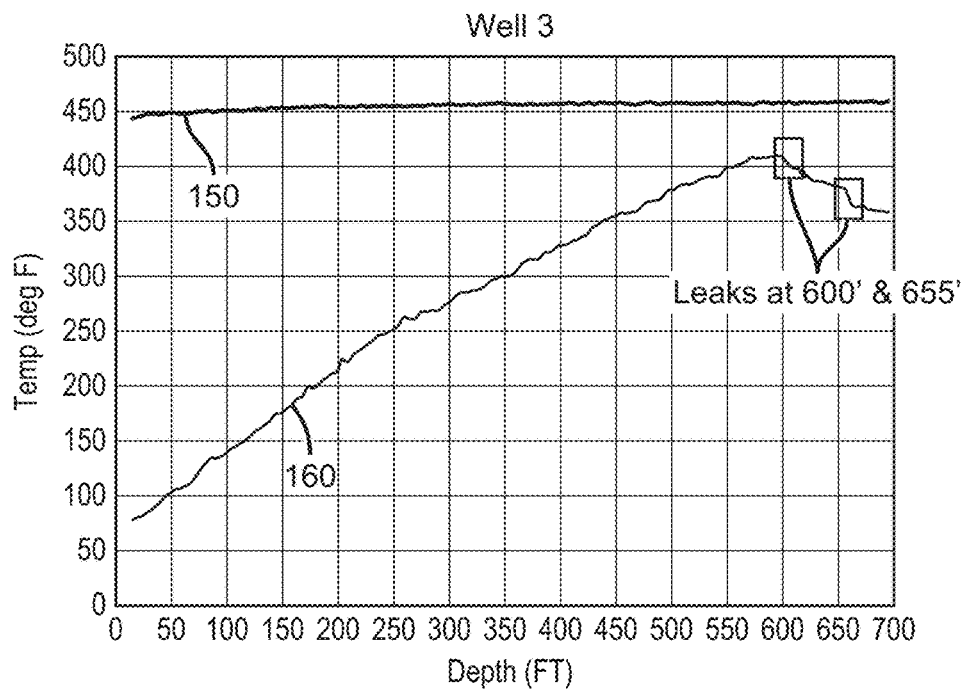
FIG. 10D is a temperature-depth chart using temperature-depth data 190 from a shallow portion of Well 3 to generate a baseline temperature profile 150 prior to pumping of nitrogen gas; and a stabilized temperature profile 160 following cooldown and stabilization.
Figure 10E:
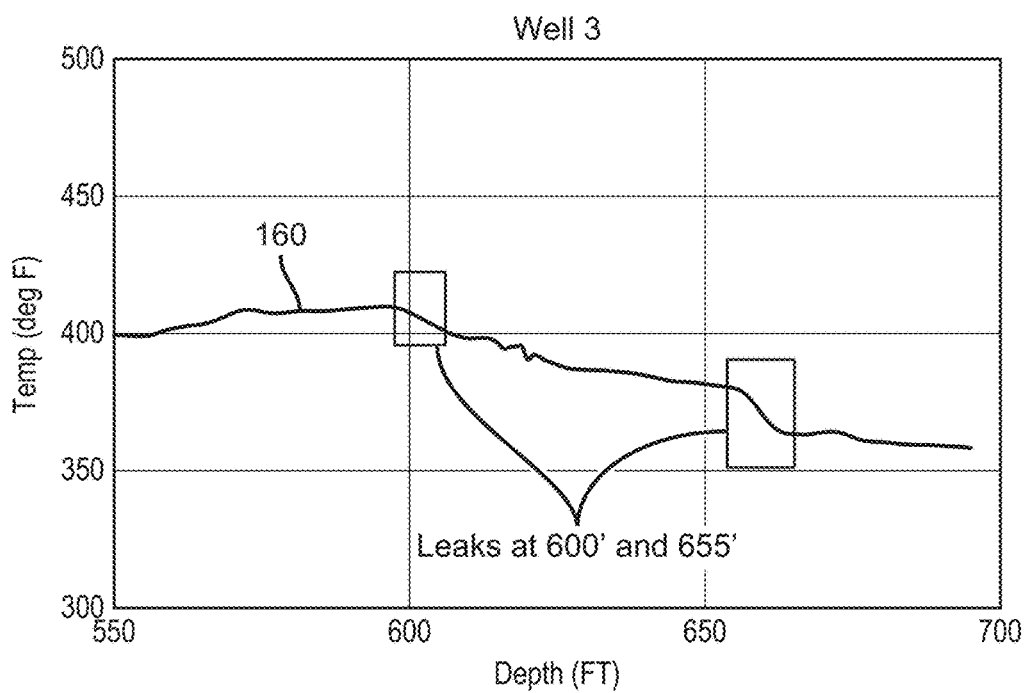
FIG. 10E is an exploded view of the stabilized temperature profile 160 of Well 3 appearing in FIG. 10D.
Figure 10F:
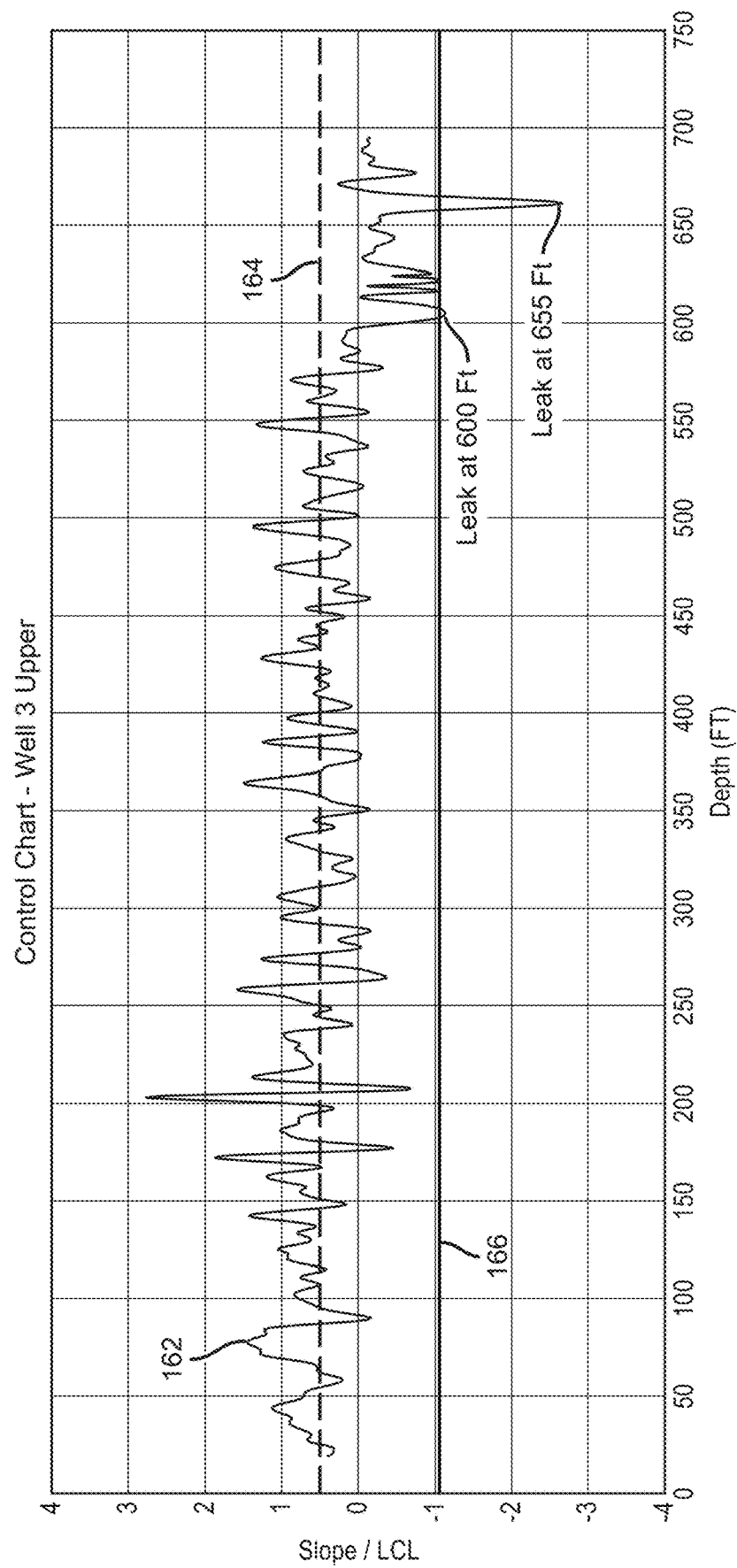
FIG. 10F is a control chart generated from the data used to generate stabilized temperature profile 160 of shallow portion of Well 3.
Figure 11A:
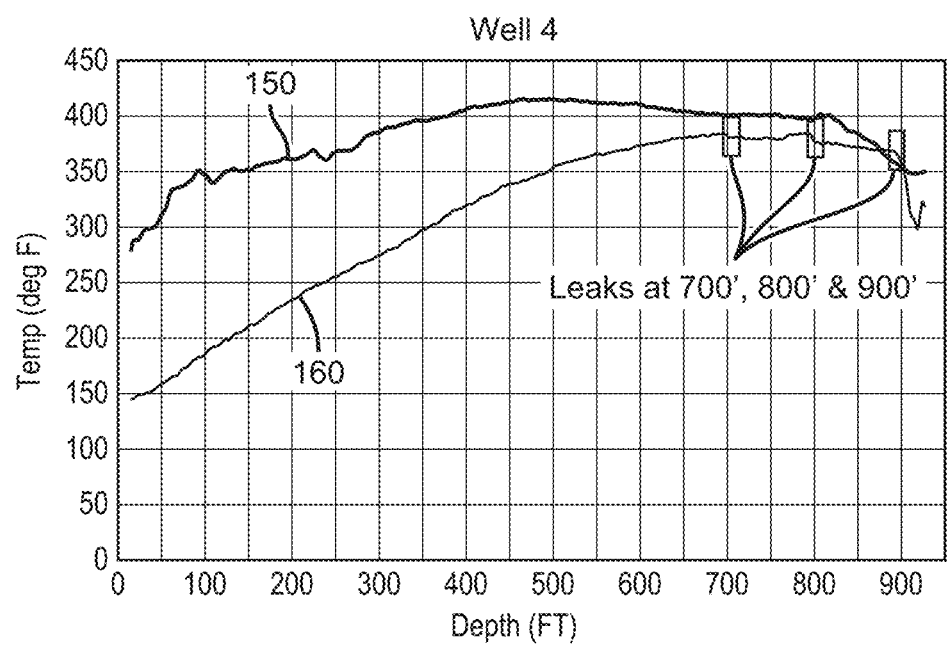
FIG. 11A is a temperature-depth chart using temperature-depth data 190 from Well 4 to generate a baseline temperature profile 150 prior to pumping of nitrogen gas; and a stabilized temperature profile 160 following cooldown and stabilization.
Figure 11B:
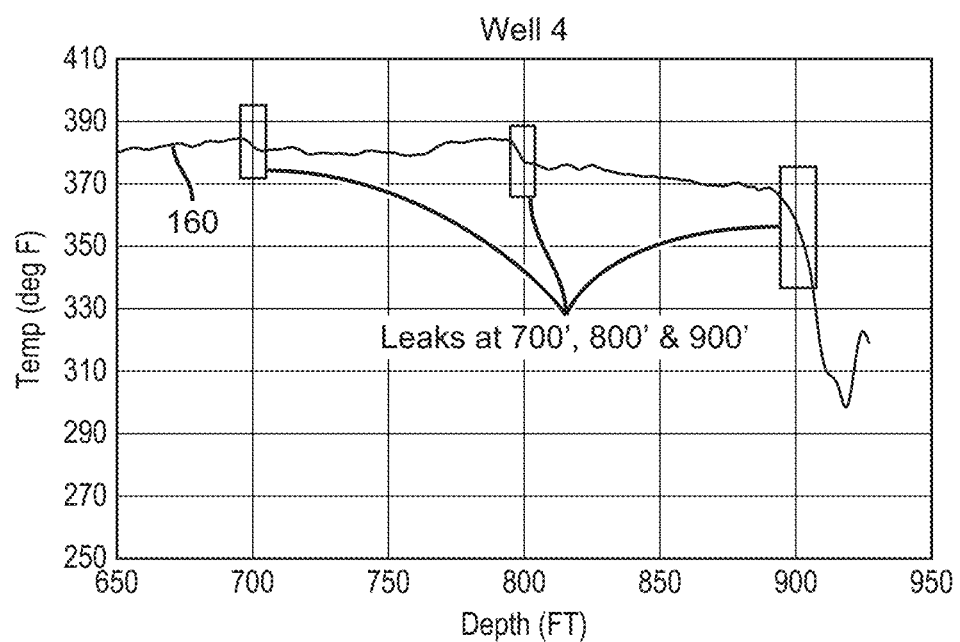
FIG. 11B is an exploded view of the stabilized temperature profile 160 of Well 4 appearing in FIG. 11A.
Figure 11C:
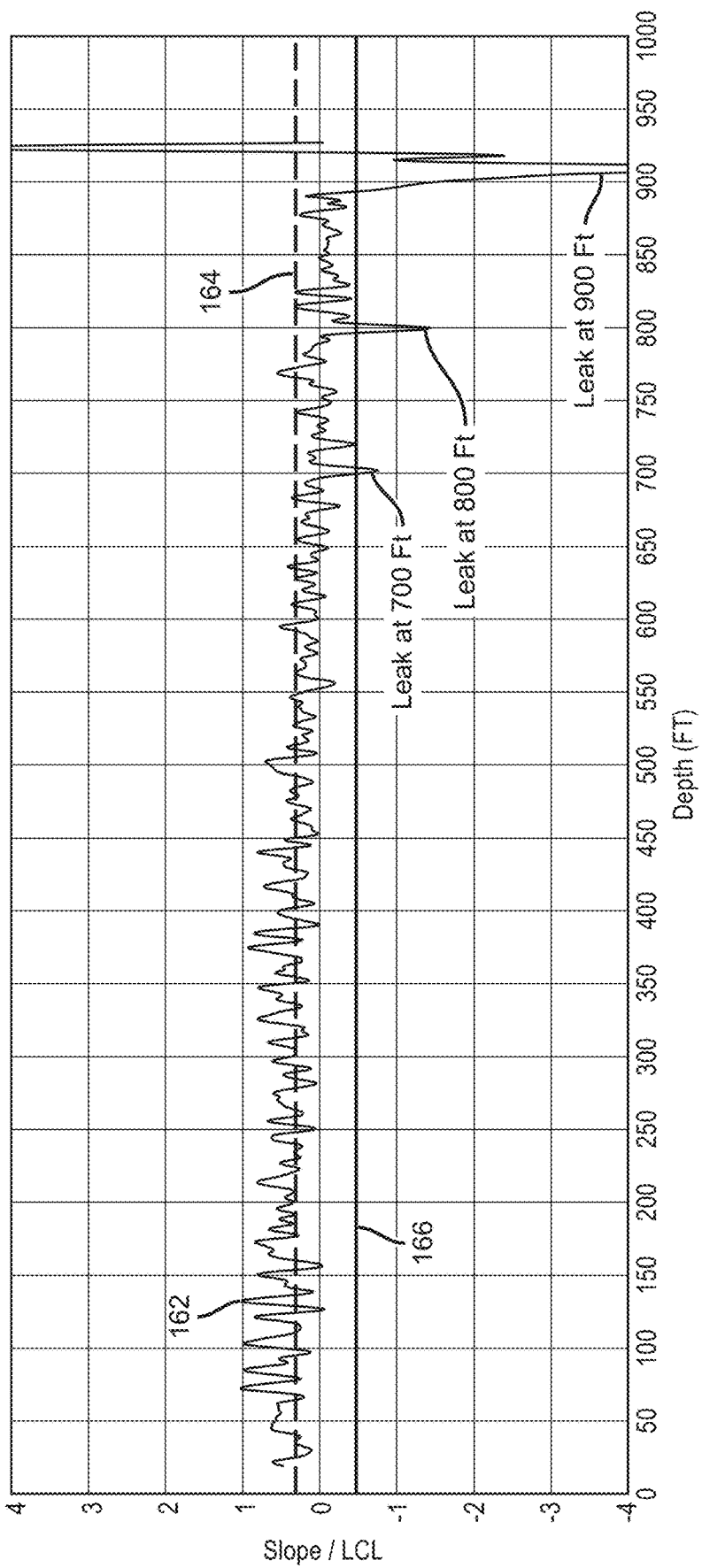
FIG. 11C is a control chart generated from the data used to generate stabilized temperature profile 160 of Well 4.
Figure 12A:
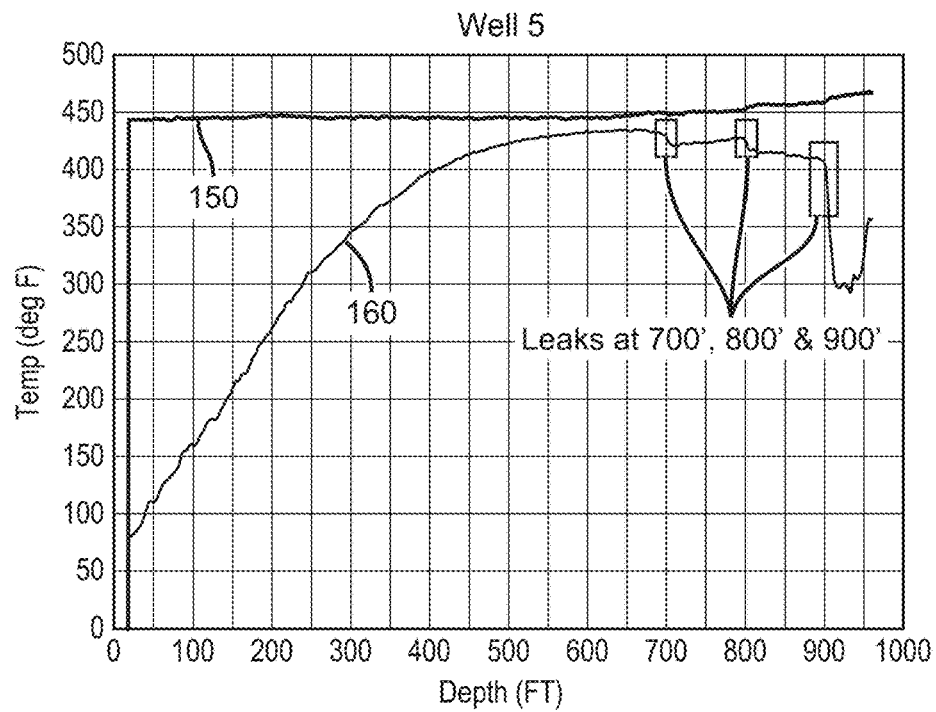
FIG. 12A is a temperature-depth chart using temperature-depth data 190 from Well 5 to generate a baseline temperature profile 150 prior to pumping of nitrogen gas; and a stabilized temperature profile 160 following cooldown and stabilization.
Figure 12B:
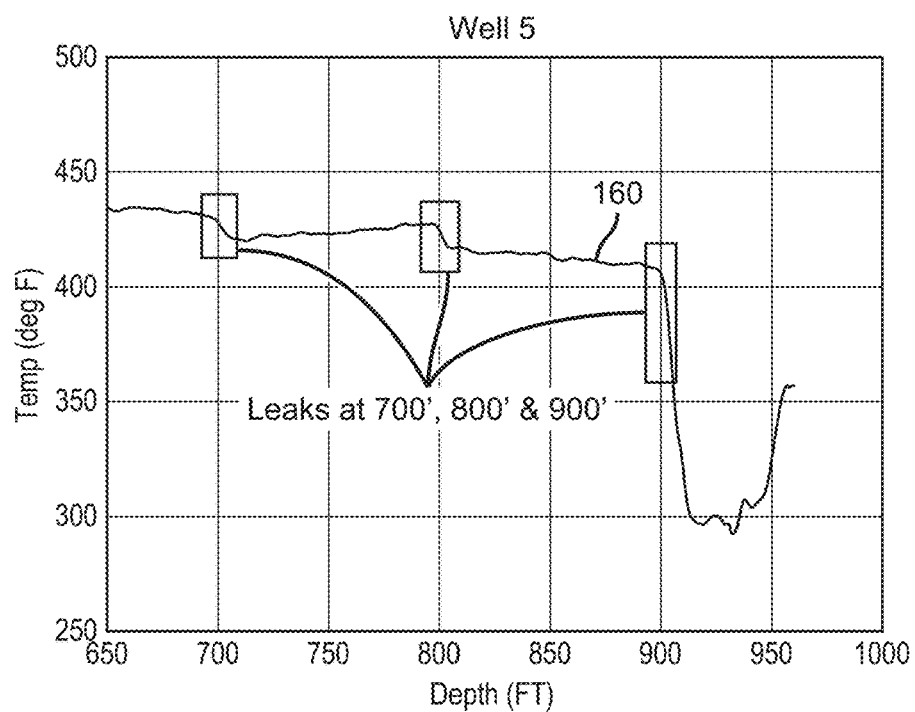
FIG. 12B is an exploded view of the stabilized temperature profile 160 of Well 5 appearing in FIG. 12A.
Figure 12C:
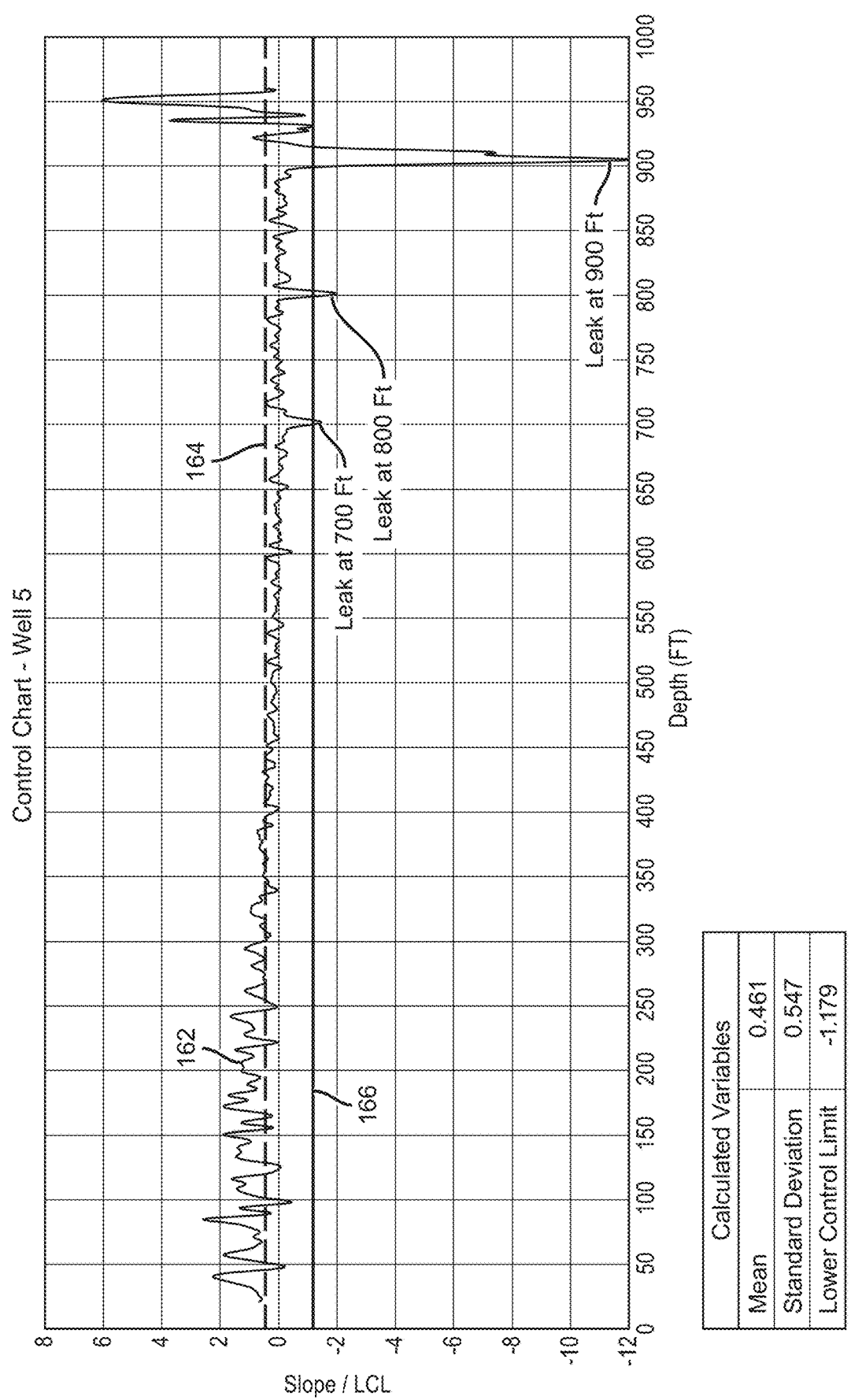
FIG. 12C is a control chart generated from the data used to generate stabilized temperature profile 160 of Well 5.

In FIG. 8B, the curve portion in the rectangle depicts temperature vs depth data around a leak at 1410 ft which is identified in the control chart FIG. 8C. Control charts were used for rapid visual identification of leaks present in each well.

To determine the depth of a leak, a series of five foot moving average temperature gradient data points 162 was calculated every one foot. One-foot was the minimum interval distance of the FO-DTS equipment used. A moving average was used rather than a slope of temperature data points due to a temperature gradient slope not necessarily being linear since temperature can rise or lower to a certain extent as depth is increased, particularly for reservoirs being injected with steam. Between surface and the lower depth for Wells 1-14, the series of moving average temperature gradients were calculated. Use of a moving average substantially greater than five feet was not able to detect all known leaks present and use of a moving average substantially less than five feet yielded false positives. Based on trial and error, it was determined use of a five-foot moving average recalculated every one foot was most preferred.

Five foot moving average temperature gradient data points calculated at one-foot intervals 162 were then used to calculate the mean 164 and the standard deviation. The LCL 166 was calculated and presented in the respective control charts according to the formula:

$$LCL = X - (M \times S)$$

where X is the mean, M is a multiplier equal to 3.0 and S is the standard deviation.

A control chart for each well is generated by computer 200 that can be viewed on video display 222 or printed by printer 226. The control chart includes: a) the series of five foot moving average temperature gradient data points calculated at one-foot intervals 162; b) the mean 164; and c) the LCL 166. Control charts for Wells 1-14 are illustrated in FIGS. 8C, 9C, 10C, 10F, 11C, 12C, 13C, 14C, 15C, 16C, 17B, 18B, 19B and 20C respectively. A moving average temperature gradient data point 162 below LCL 166 indicates the presence of a leak in the casing string at a specific depth.

For all steam injection wells tested, M=3.0 was used in the LCL formula, the results of which are presented in the control charts shown in FIGS. 8C, 9C, 10C, 10F, 11C, 12C, 13C, 14C, 15C, 16C, 17B, 18B, 19B, 20C and 21C. The depth of the top perforation into the reservoir of each well is shown in some of the figures by vertical line 168.

Figure 13A:
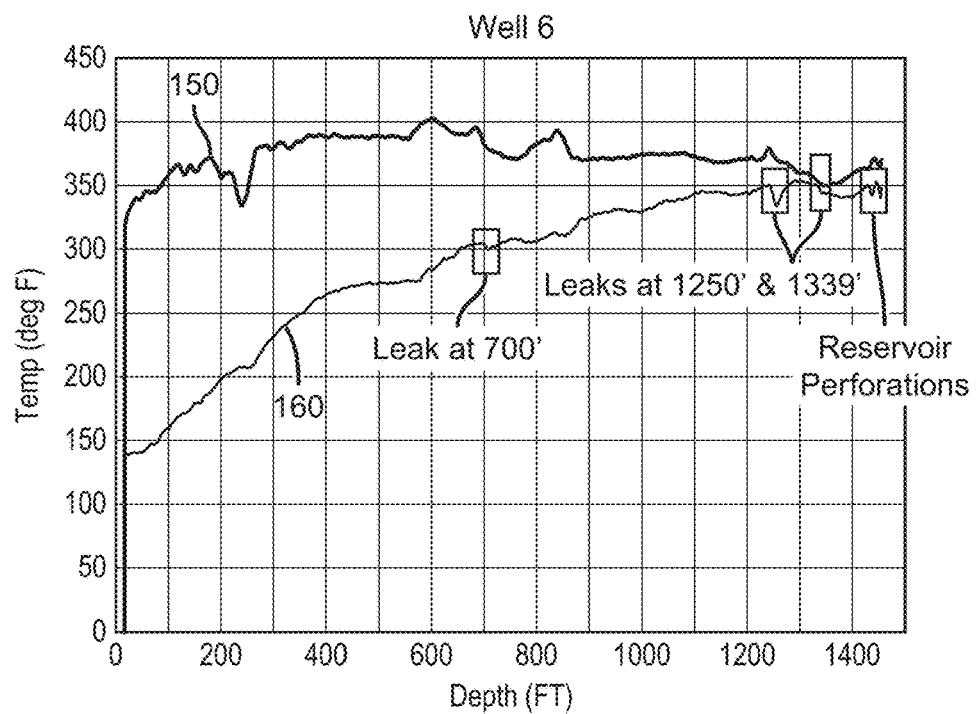
FIG. 13A is a temperature-depth chart using temperature-depth data 190 from Well 6 to generate a baseline temperature profile 150 prior to pumping of nitrogen gas; and a stabilized temperature profile 160 following cooldown and stabilization.
Figure 13B:
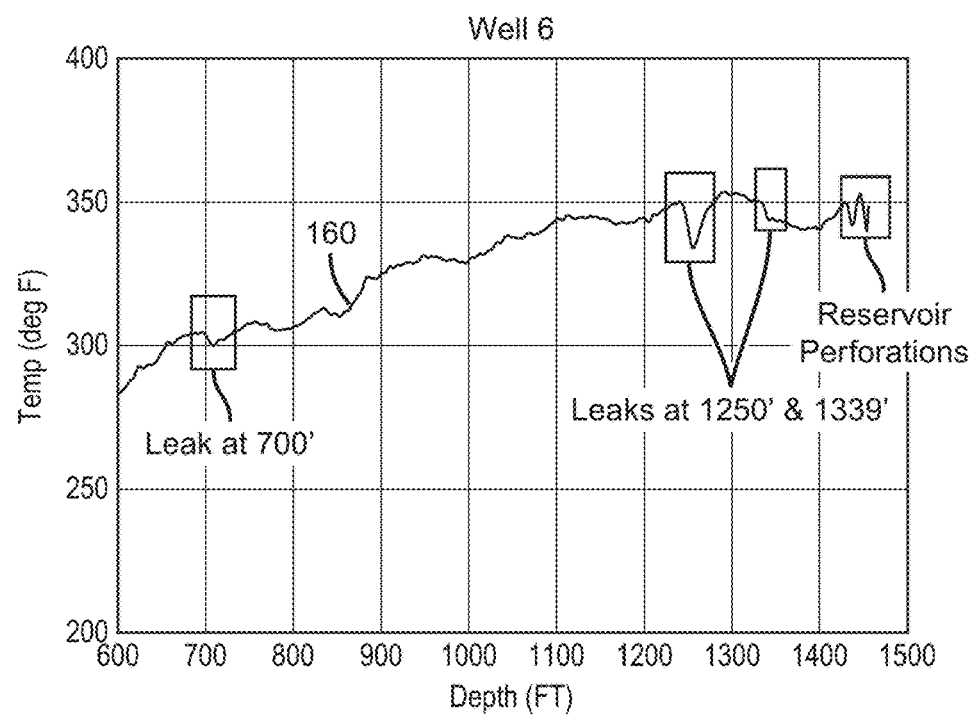
FIG. 13B is an exploded view of the stabilized temperature profile 160 of Well 6 appearing in FIG. 13A.
Figure 13C:
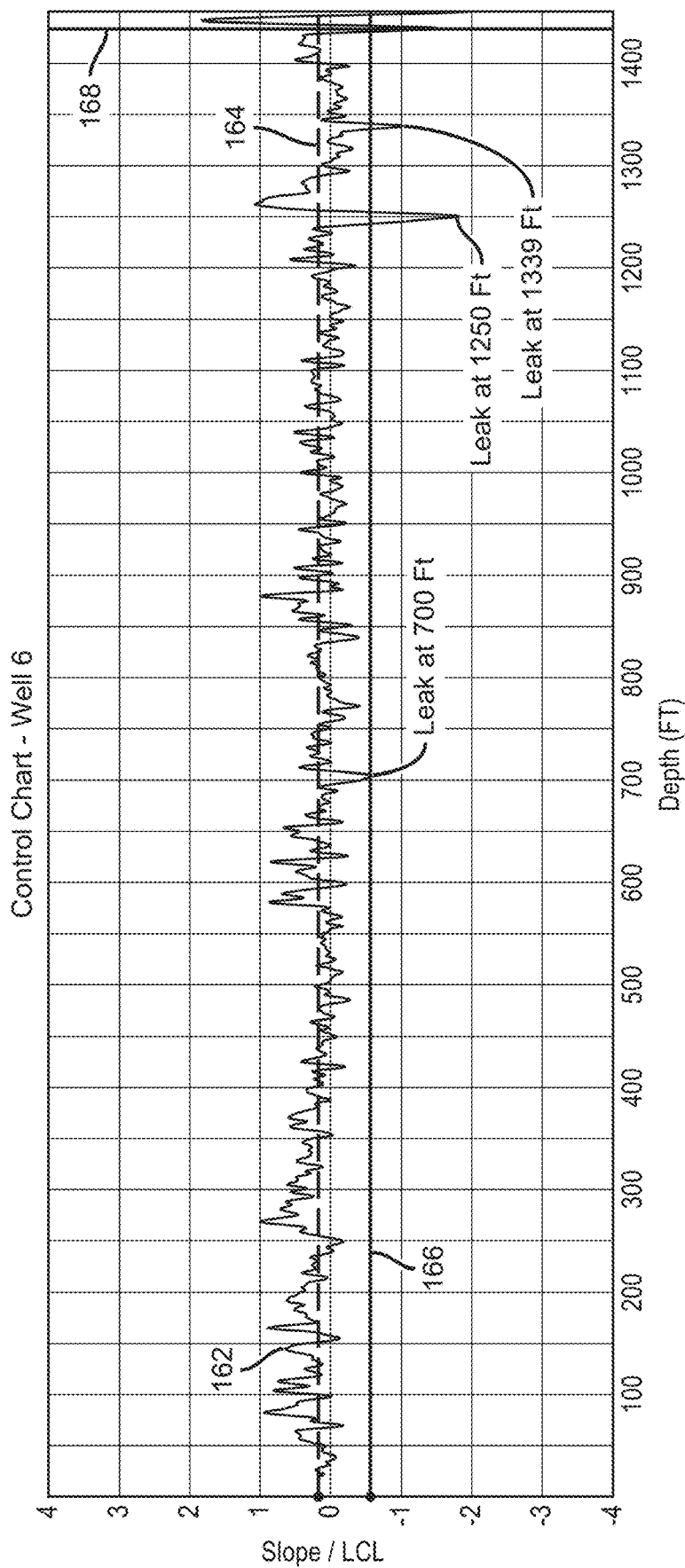
FIG. 13C is a control chart generated from the data used to generate stabilized temperature profile 160 of Well 6 where LCL is calculated using M=3.0.
Figure 13D:
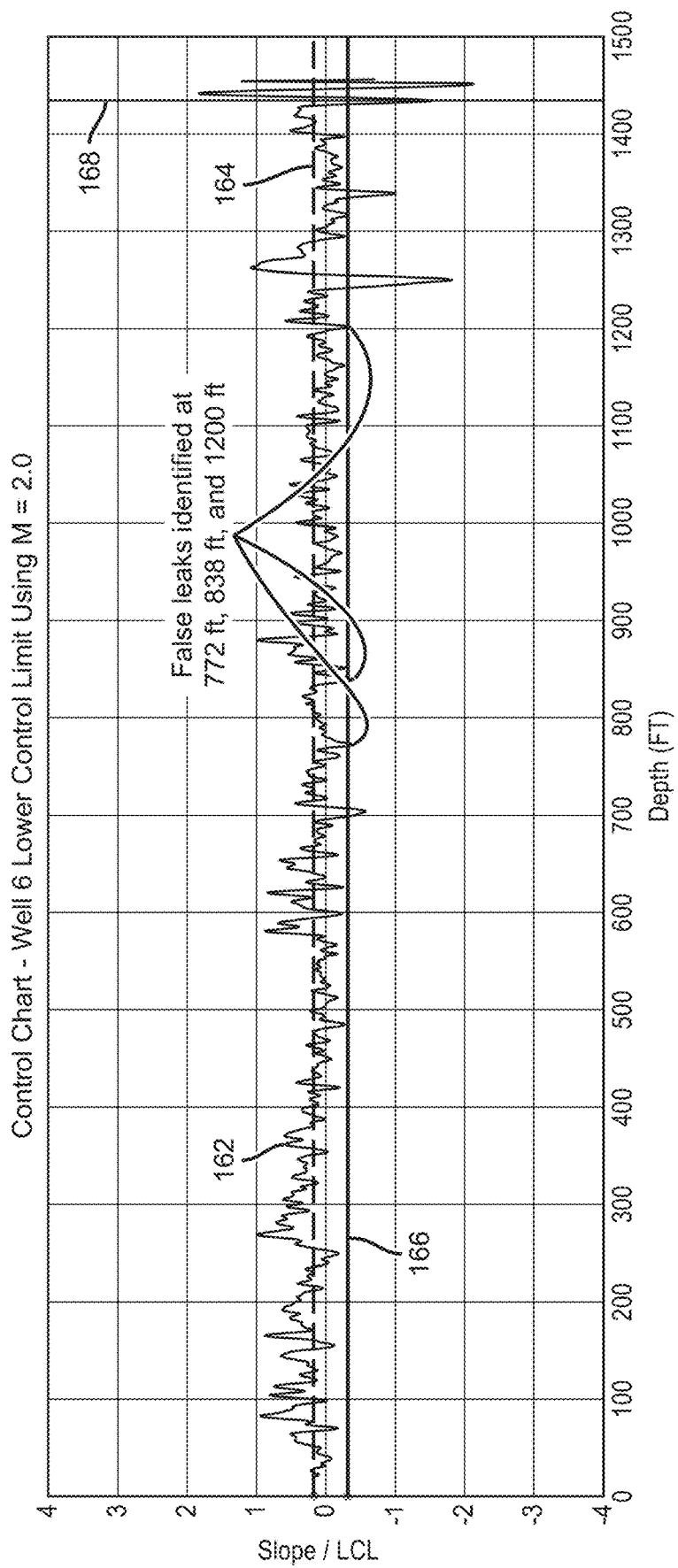
FIG. 13D is a control chart generated from the data used to generate stabilized temperature profile 160 of Well 6 where LCL is calculated using M=2.0.
Figure 13E:
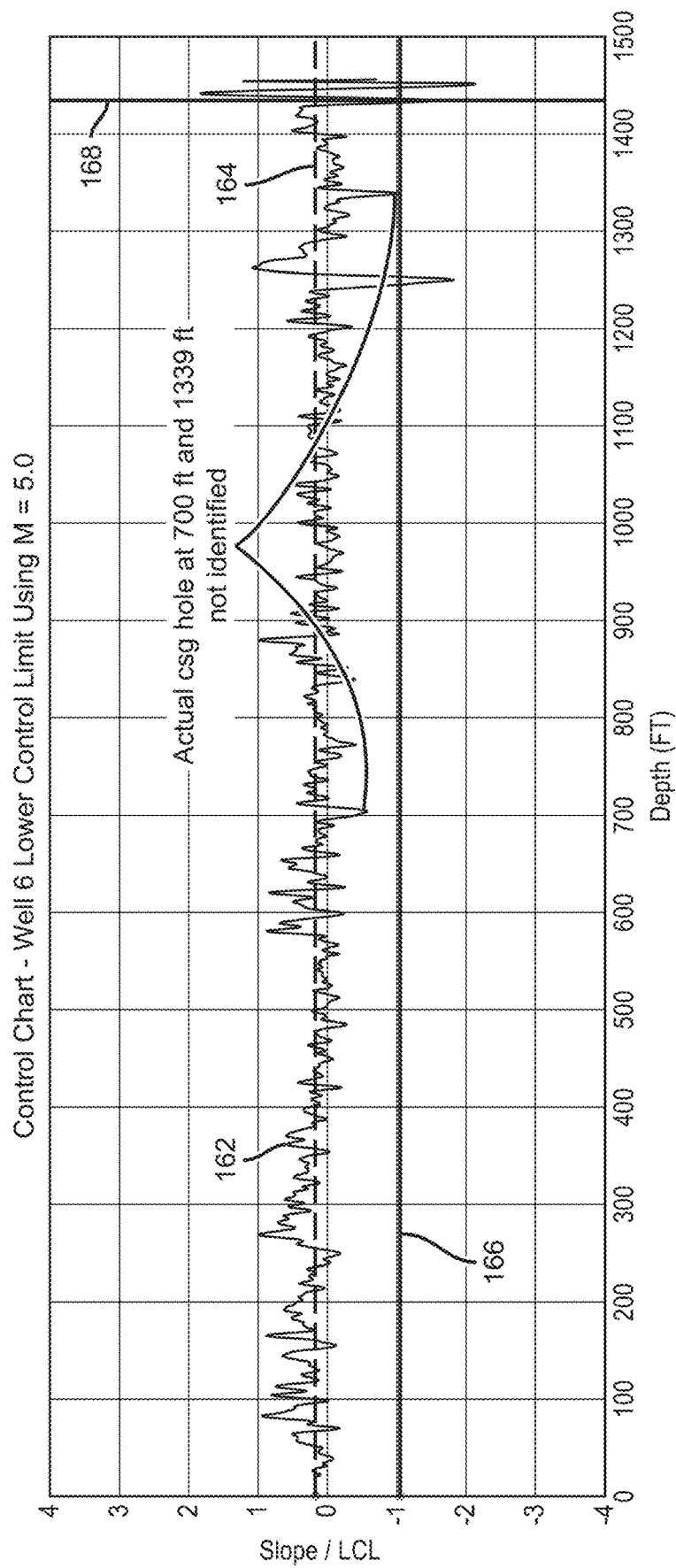
FIG. 13E is a control chart generated from the data used to generate stabilized temperature profile 160 of Well 6 where LCL is calculated using M=5.0.
Figure 14A:
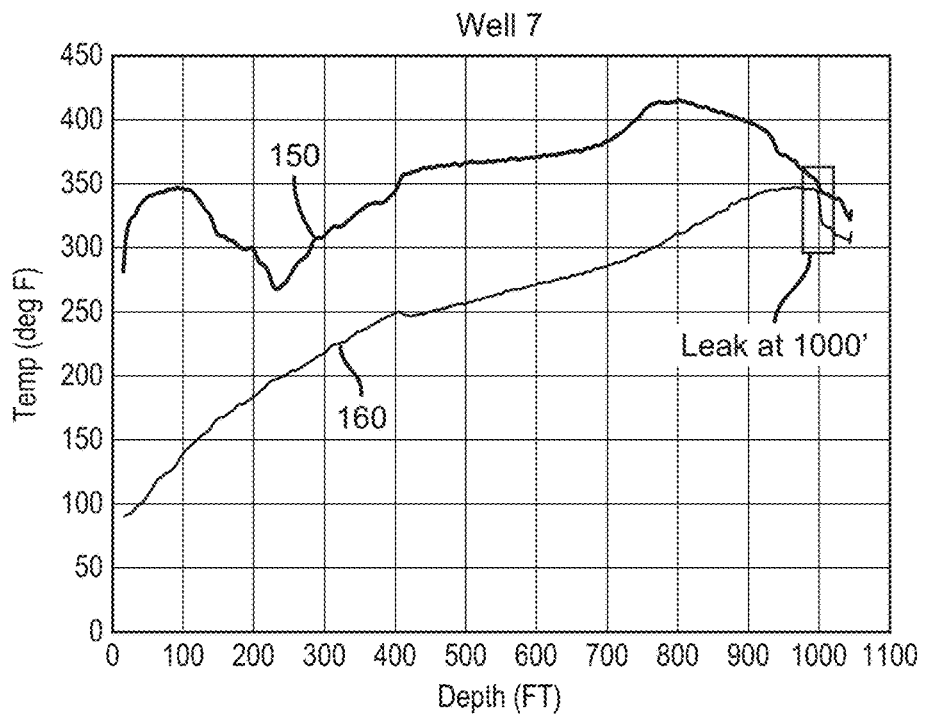
FIG. 14A is a temperature-depth chart using temperature-depth data 190 from Well 7 to generate a baseline temperature profile 150 prior to pumping of nitrogen gas; and a stabilized temperature profile 160 following cooldown and stabilization.
Figure 14B:
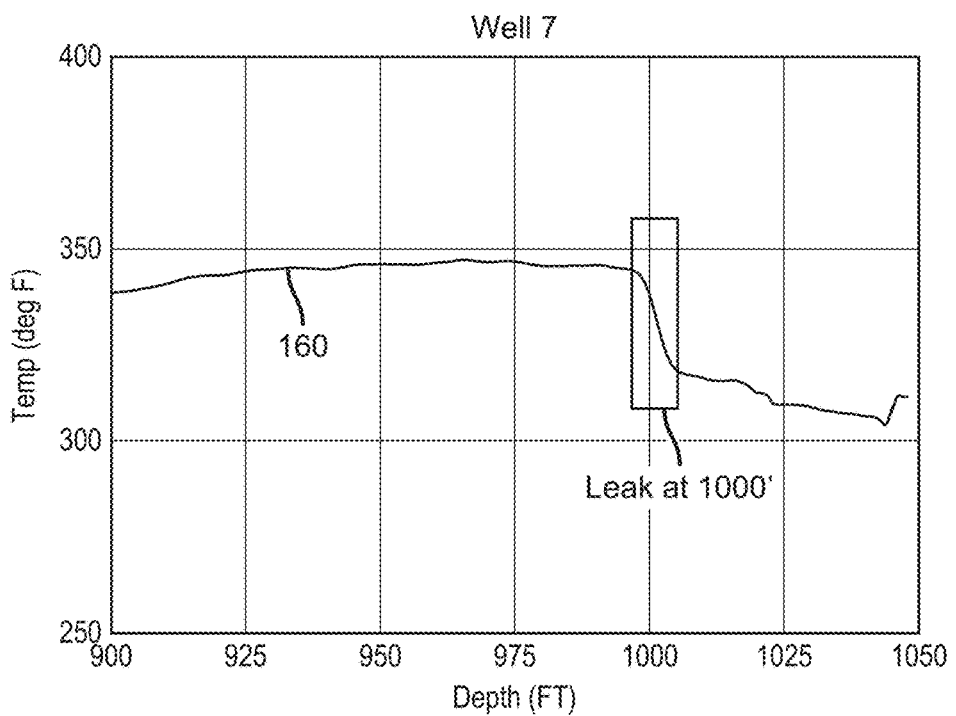
FIG. 14B is an exploded view of the stabilized temperature profile 160 of Well 7 appearing in FIG. 14A.
Figure 14C:
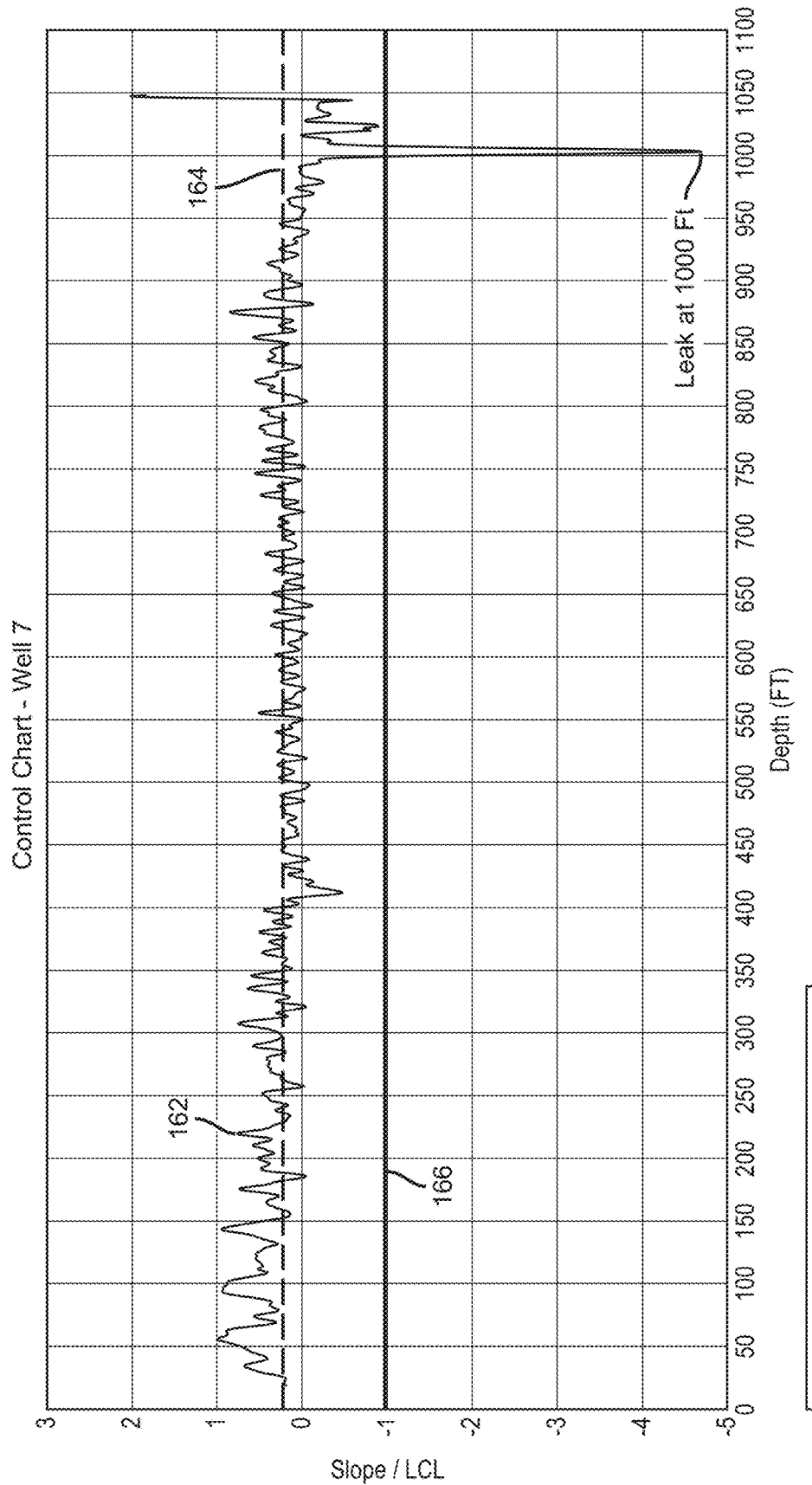
FIG. 14C is a control chart generated from the data used to generate stabilized temperature profile 160 of Well 7.
Figure 15A:
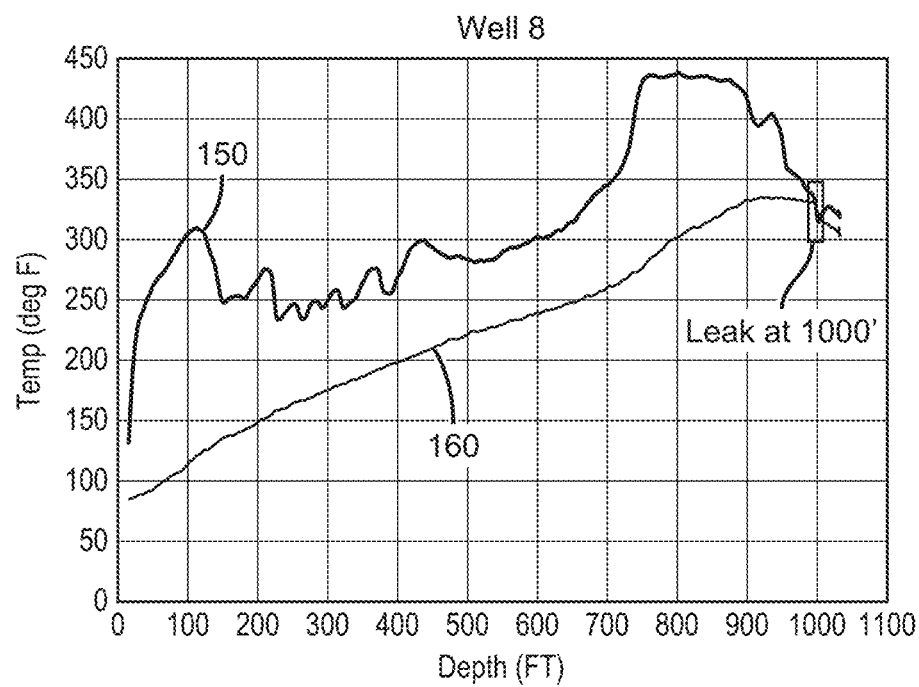
FIG. 15A is a temperature-depth chart using temperature-depth data 190 from Well 8 to generate a baseline temperature profile 150 prior to pumping of nitrogen gas; and a stabilized temperature profile 160 following cooldown and stabilization.
Figure 15B:
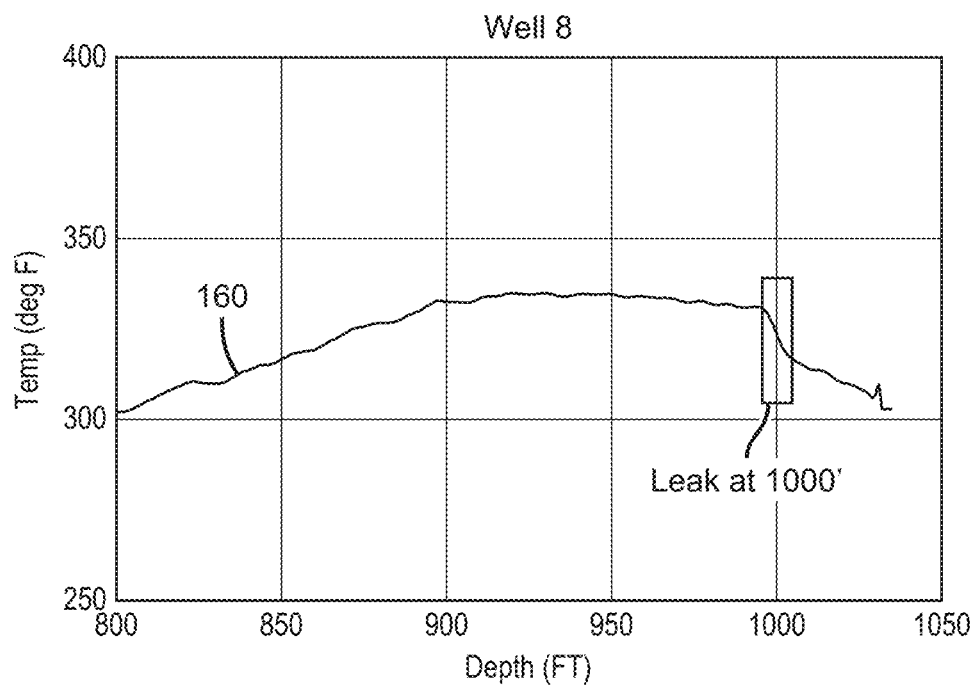
FIG. 15B is an exploded view of the stabilized temperature profile 160 of Well 8 appearing in FIG. 15A.
Figure 15C:
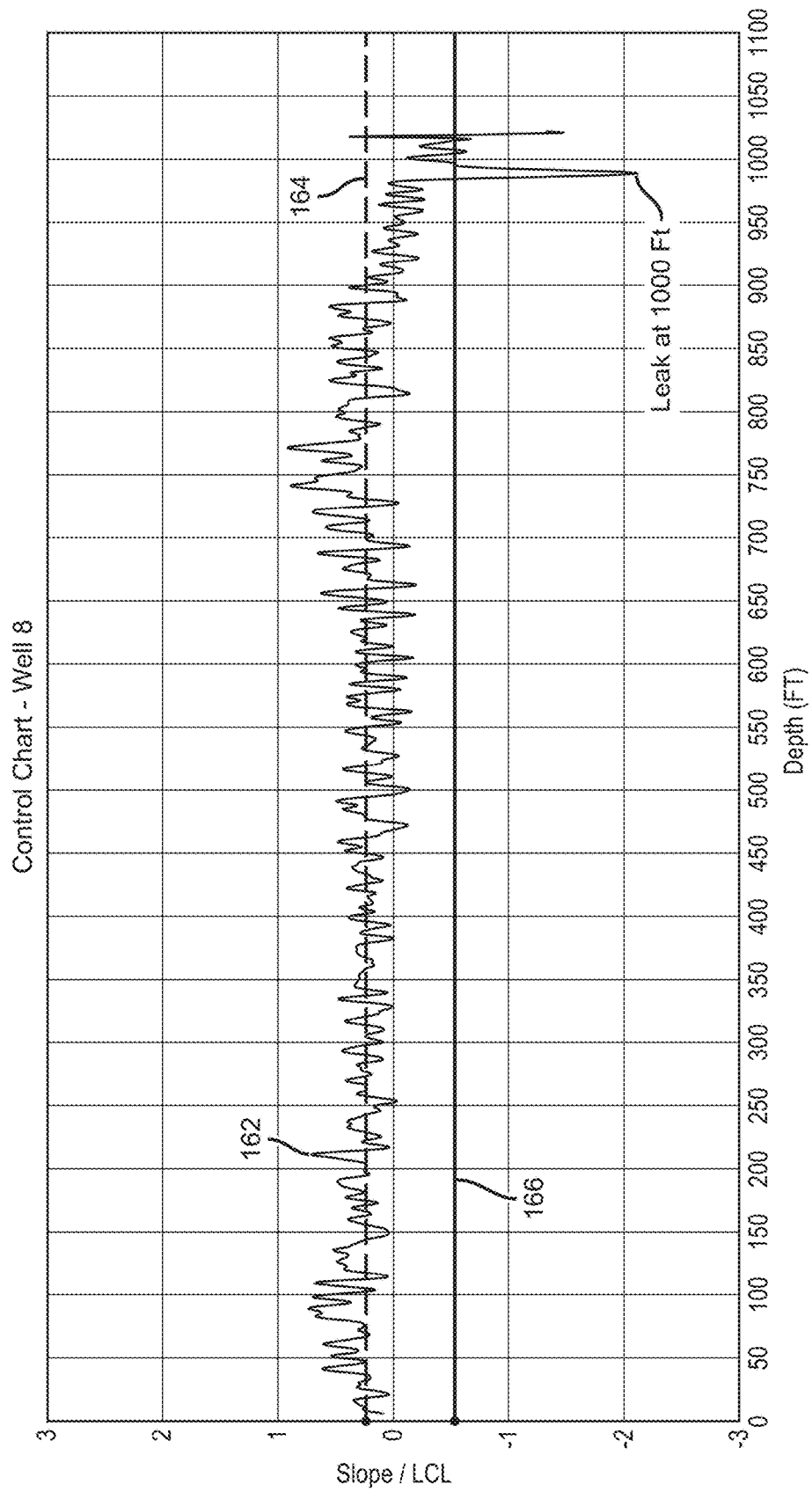
FIG. 15C is a control chart generated from the data used to generate stabilized temperature profile 160 of Well 8.
Figure 16A:
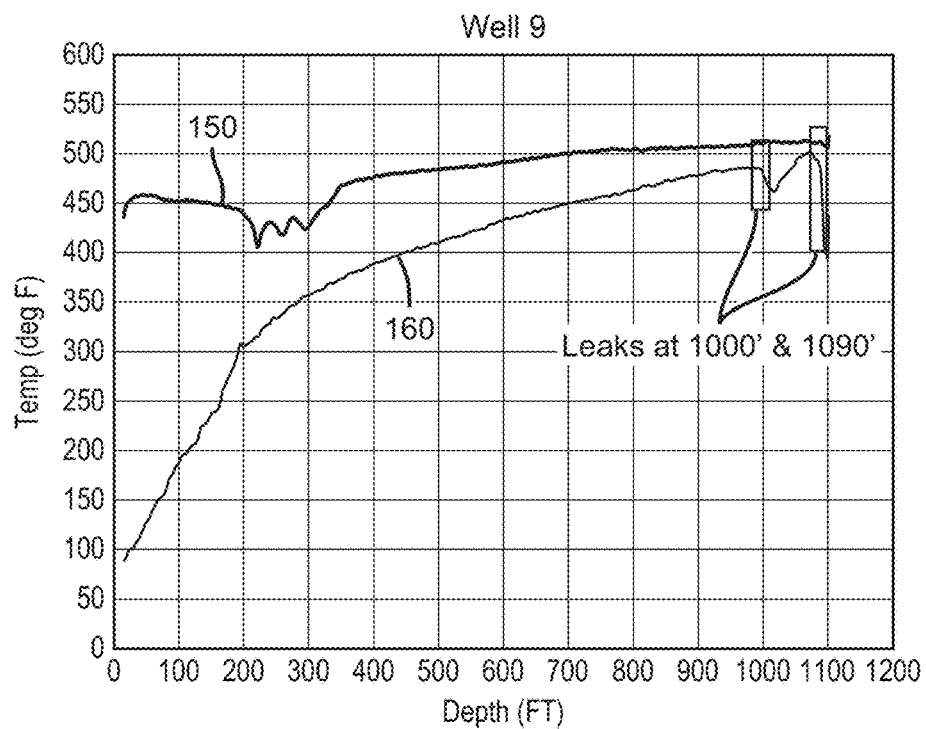
FIG. 16A is a temperature-depth chart using temperature-depth data 190 from Well 9 to generate a baseline temperature profile 150 prior to pumping of nitrogen gas; and a stabilized temperature profile 160 following cooldown and stabilization.
Figure 16B:
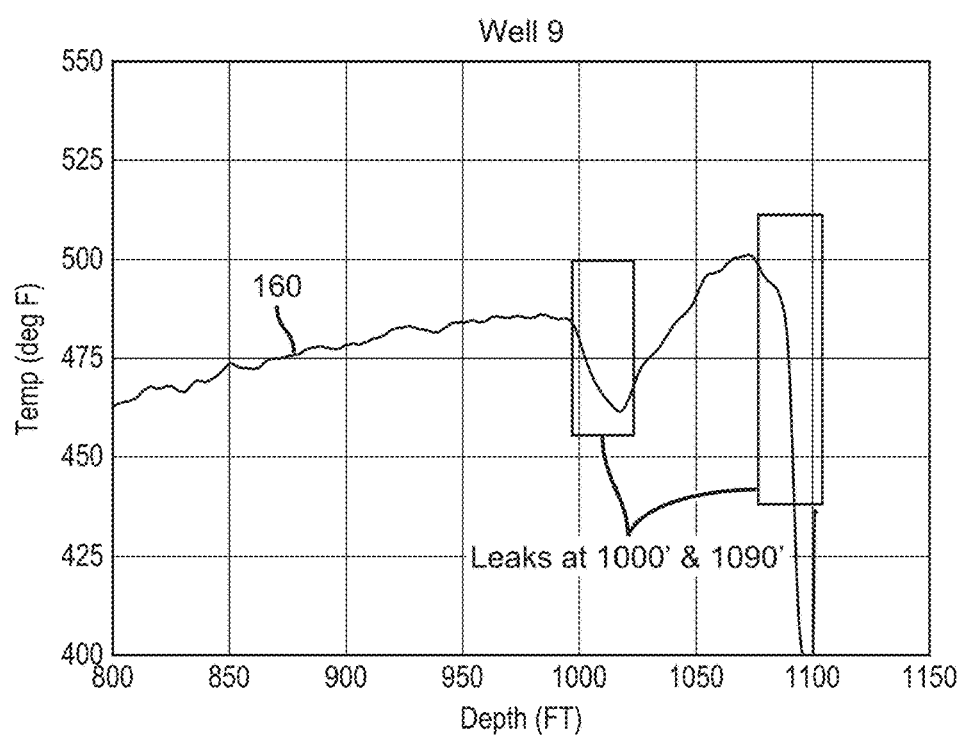
FIG. 16B is an exploded view of the stabilized temperature profile 160 of Well 9 appearing in FIG. 16A.
Figure 16C:
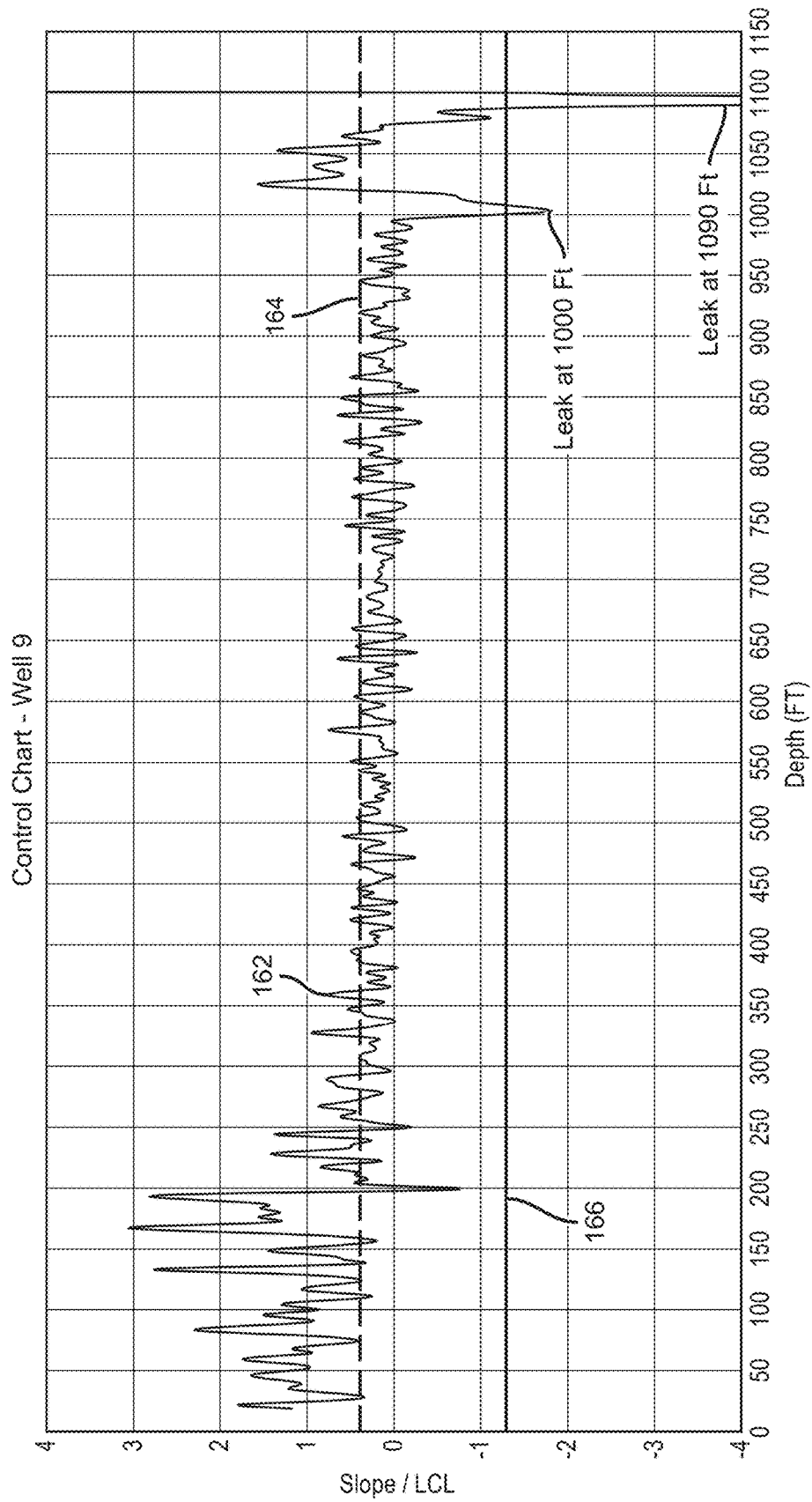
FIG. 16C is a control chart generated from the data used to generate stabilized temperature profile 160 of Well 9.
Figure 17A:
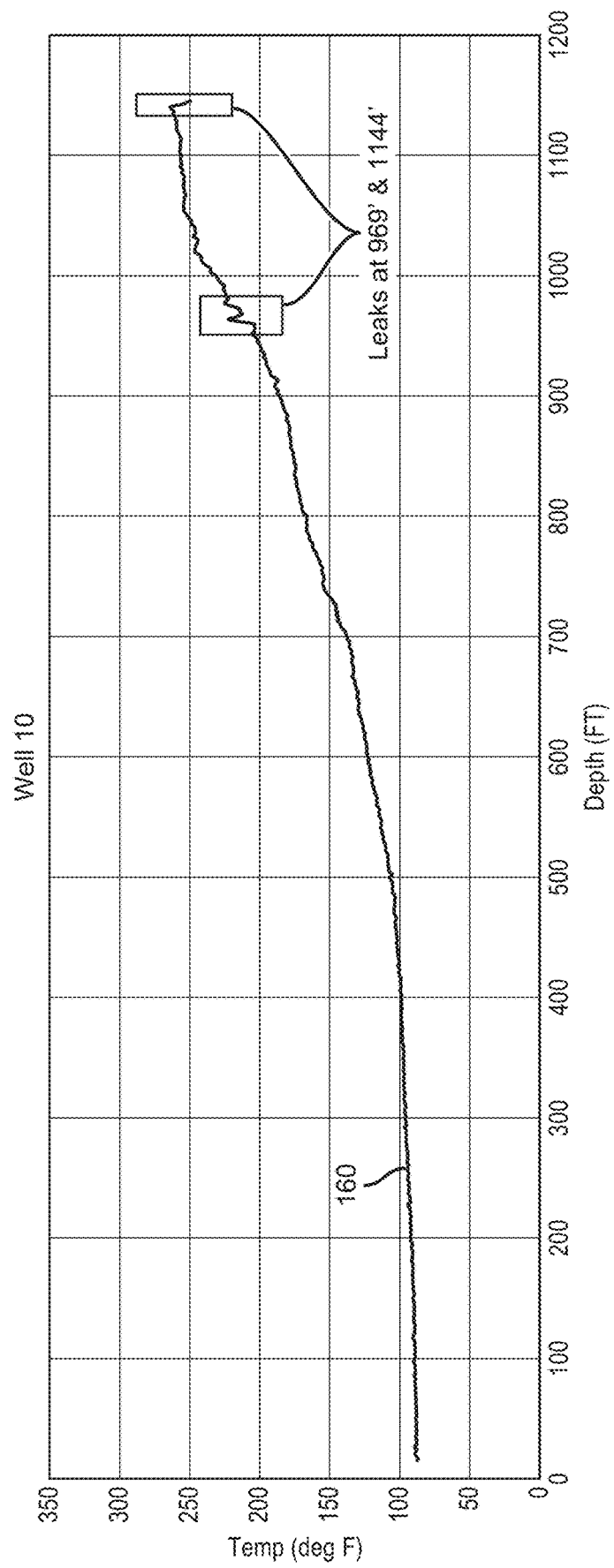
FIG. 17A is a temperature-depth chart using temperature-depth data 190 from Well 10 to generate a stabilized temperature profile 160 following cooldown of the wellbore using nitrogen gas.
Figure 17B:
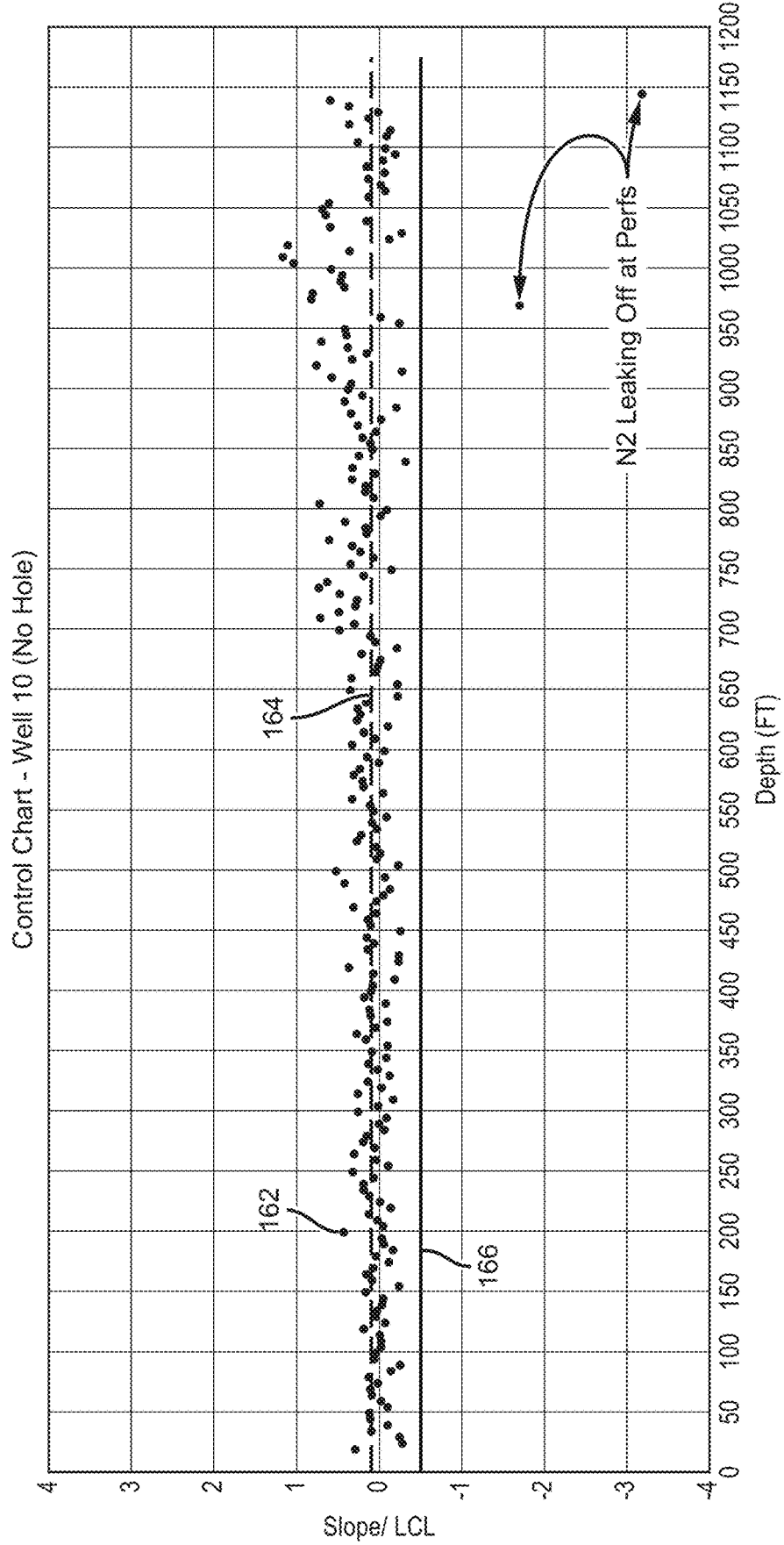
FIG. 17B is a control chart generated from the data used to generate stabilized temperature profile 160 of Well 10.
Figure 18A:
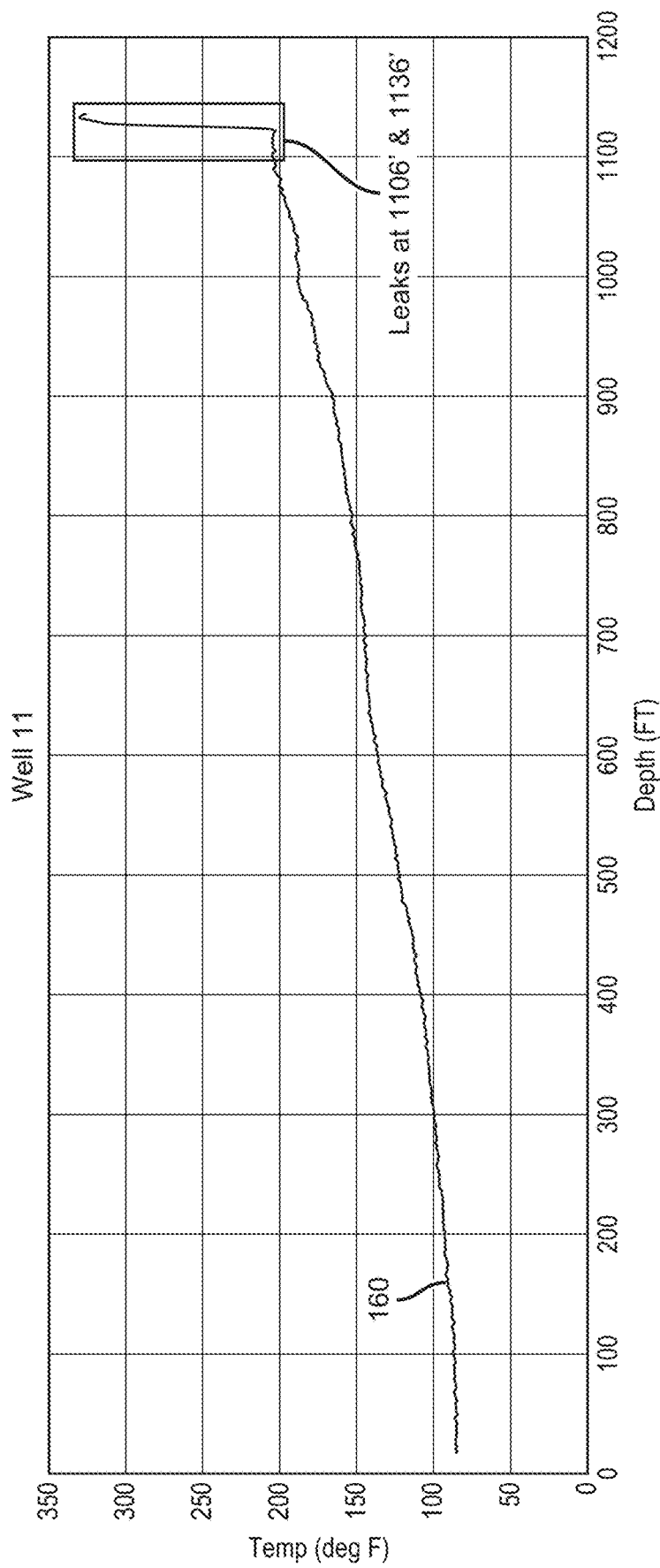
FIG. 18A is a temperature-depth chart using temperature-depth data 190 from Well 11 to generate a stabilized temperature profile 160 following cooldown of the wellbore using nitrogen gas.
Figure 18B:
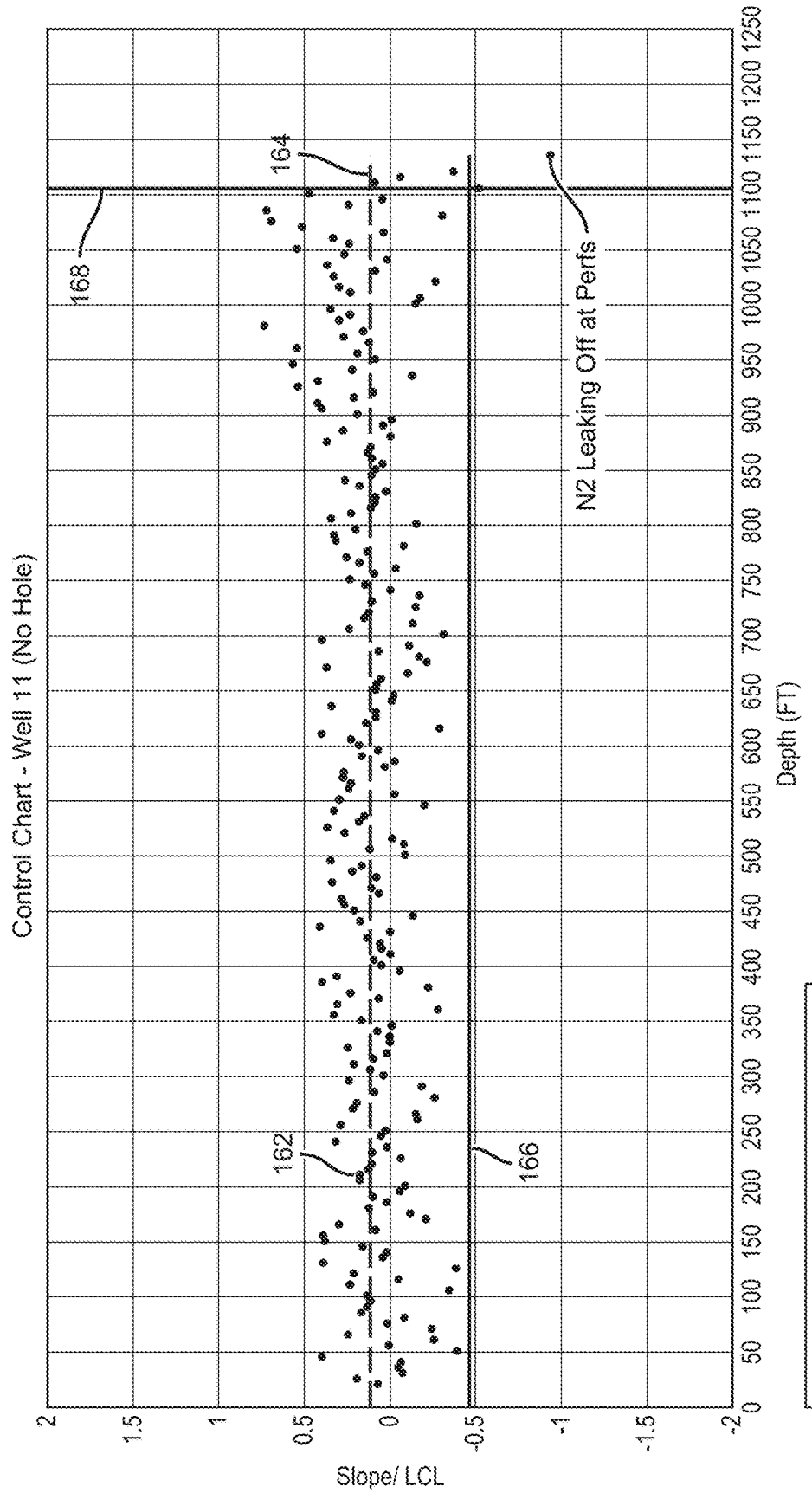
FIG. 18B is a control chart generated from the data used to generate stabilized temperature profile 160 of Well 11.
Figure 19A:
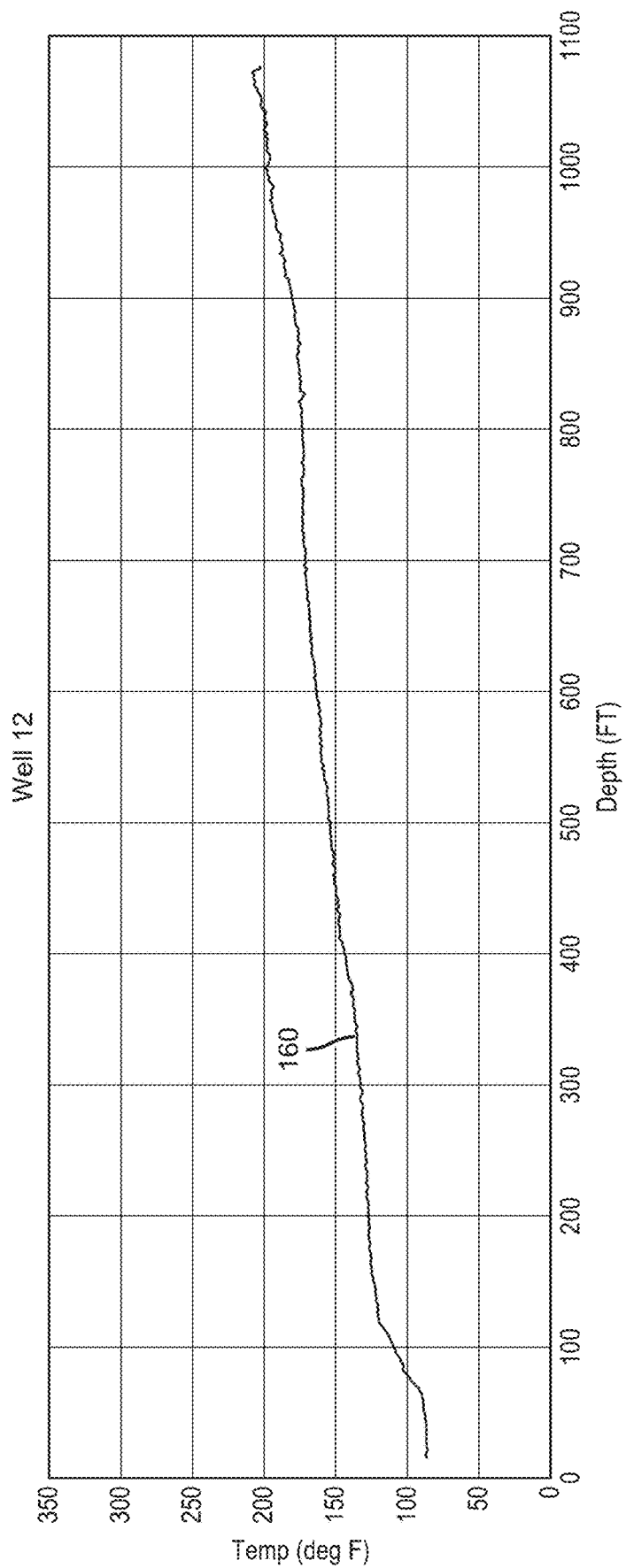
FIG. 19A is a temperature-depth chart using temperature-depth data 190 from Well 12 to generate a stabilized temperature profile 160 following cooldown of the wellbore using nitrogen gas.
Figure 19B:
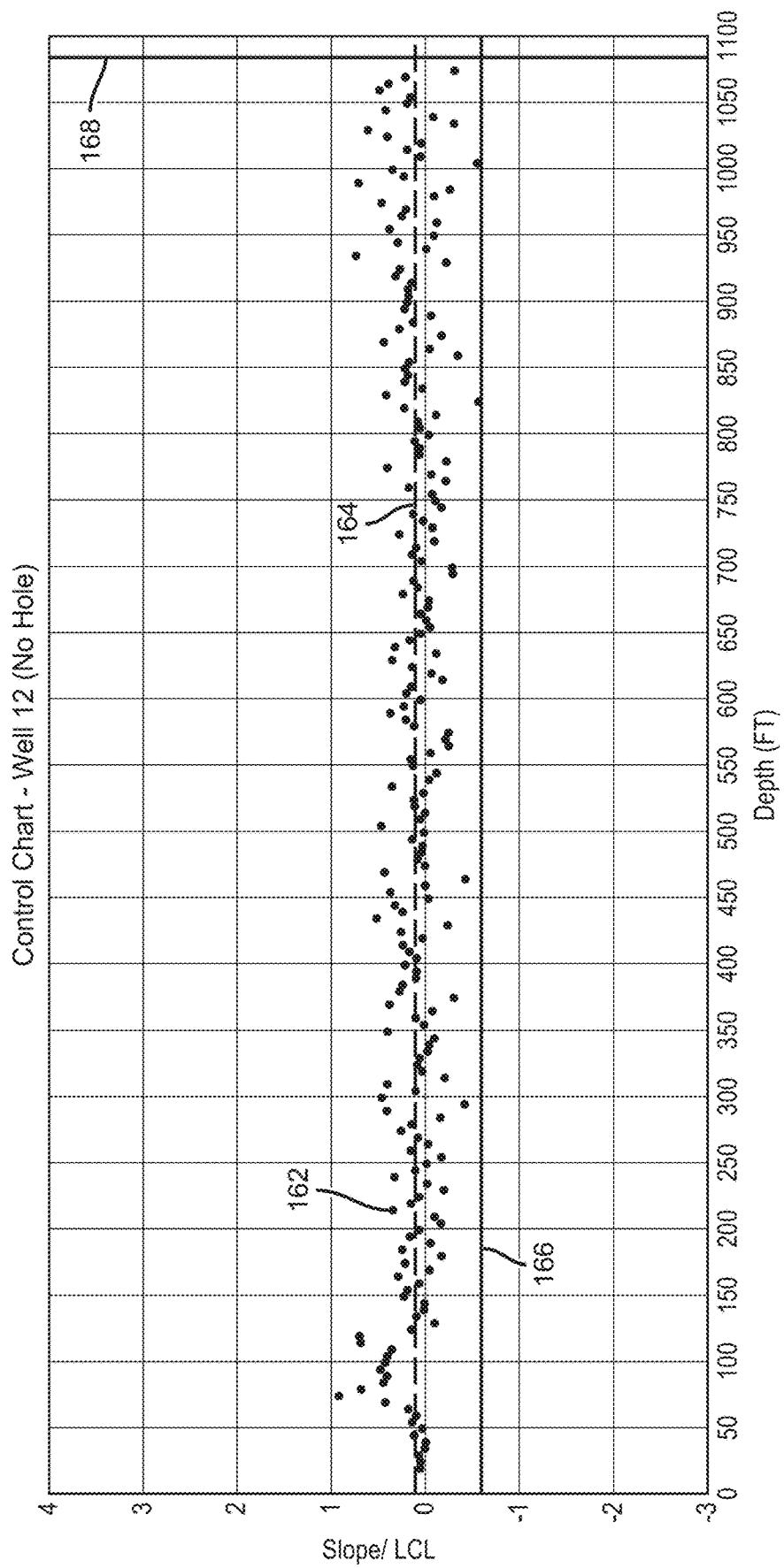
FIG. 19B is a control chart generated from the data used to generate stabilized temperature profile 160 of Well 12.
Figure 20A:
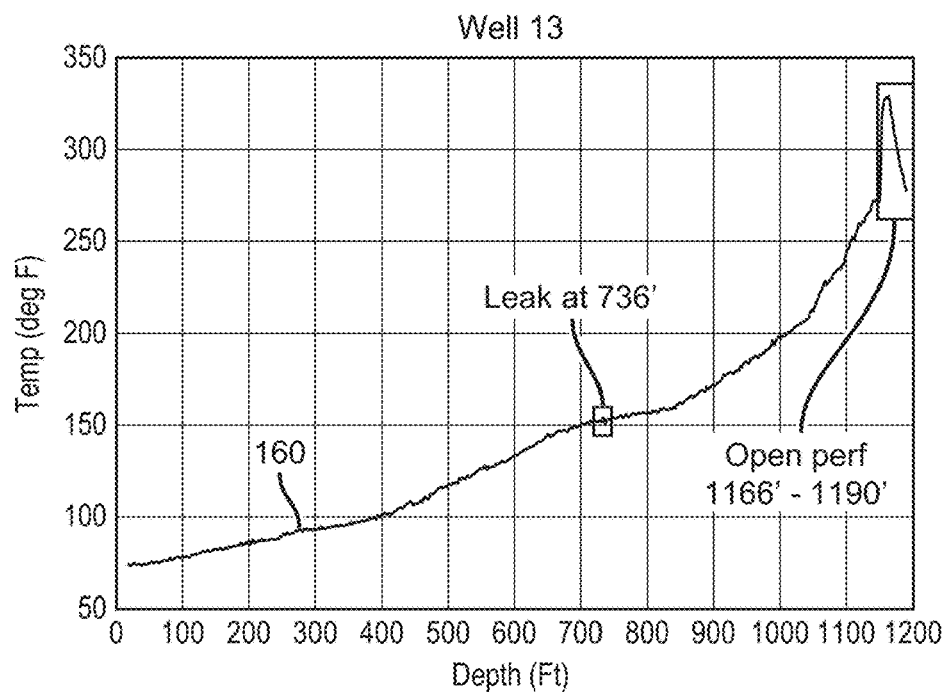
FIG. 20A is a temperature-depth chart using temperature-depth data 190 from Well 13 to generate a stabilized temperature profile 160 following cooldown of the wellbore using nitrogen gas.
Figure 20B:
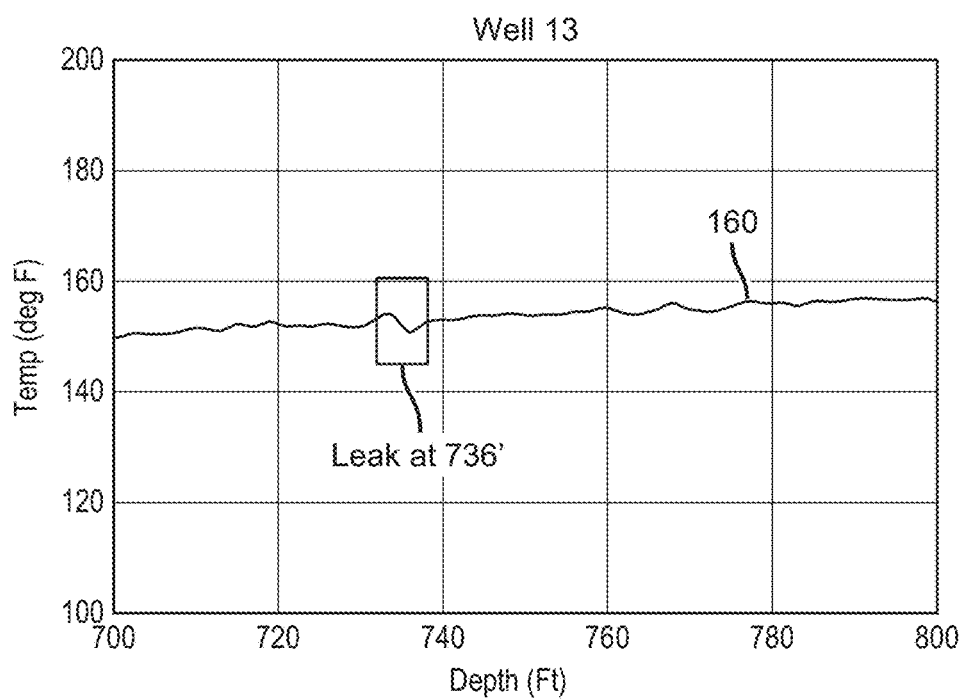
FIG. 20B is an exploded view of the stabilized temperature profile 160 of Well 13 appearing in FIG. 20A.
Figure 20C:
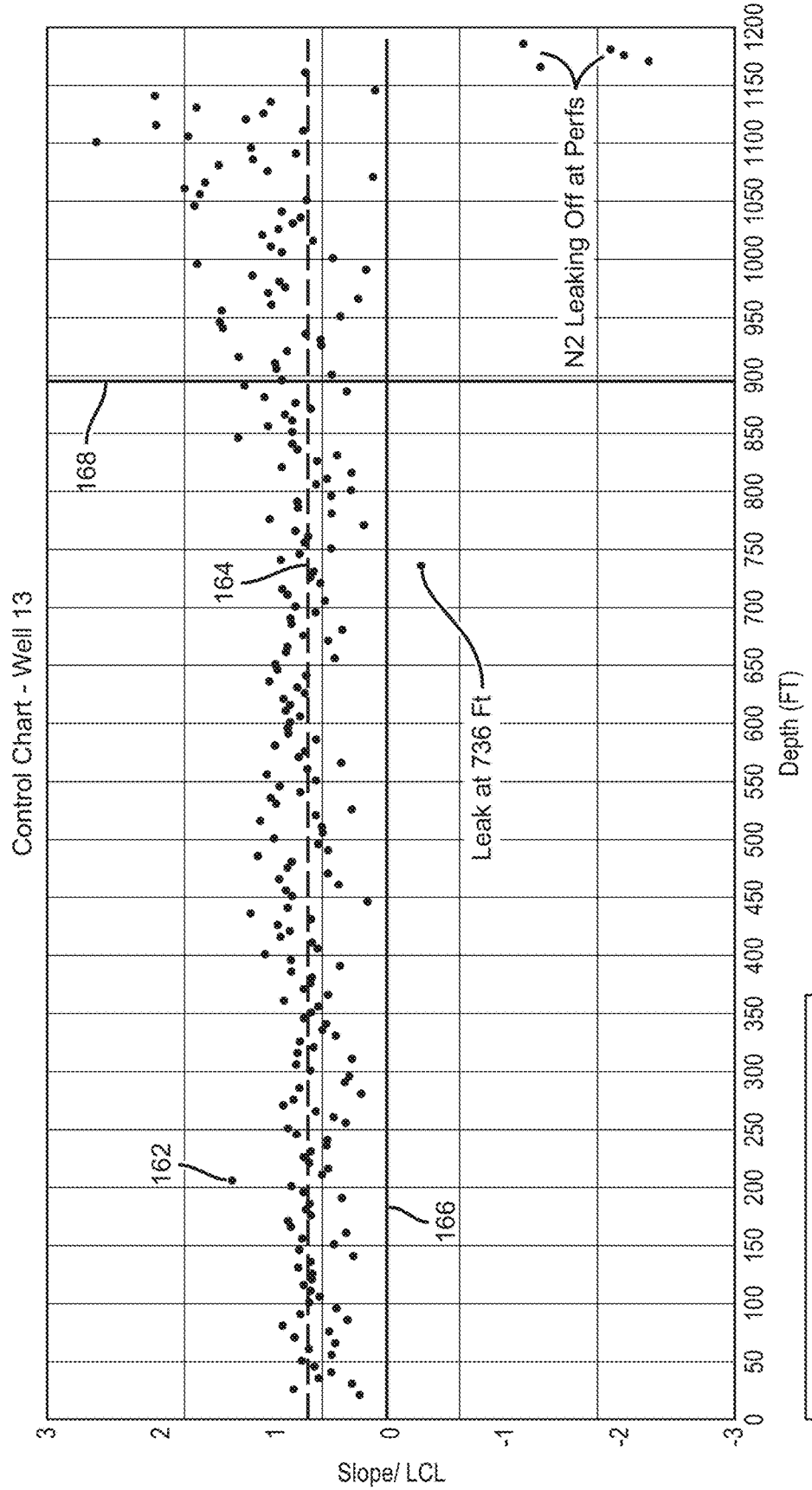
FIG. 20C is a control chart generated from data used to generate stabilized temperature profile 160 of Well 13.
Figure 21A:
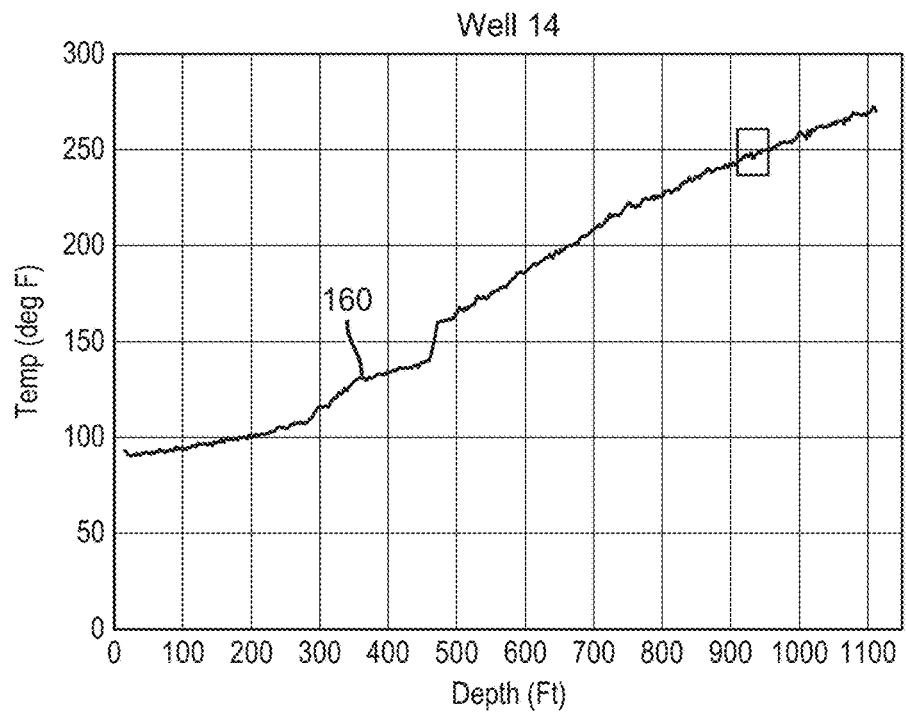
FIG. 21A is a temperature-depth chart using temperature-depth data 190 from Well 14 to generate a stabilized temperature profile 160 following cooldown of the wellbore using nitrogen gas.
Figure 21B:
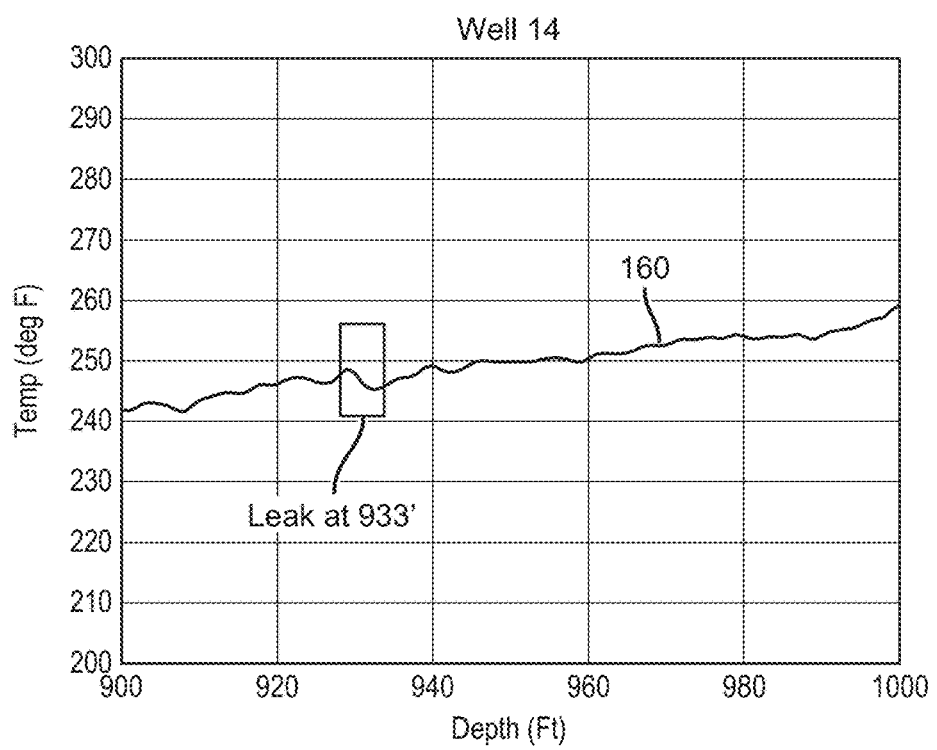
FIG. 21B is an exploded view of the stabilized temperature profile 160 of Well 14 appearing in FIG. 21A.
Figure 21C:
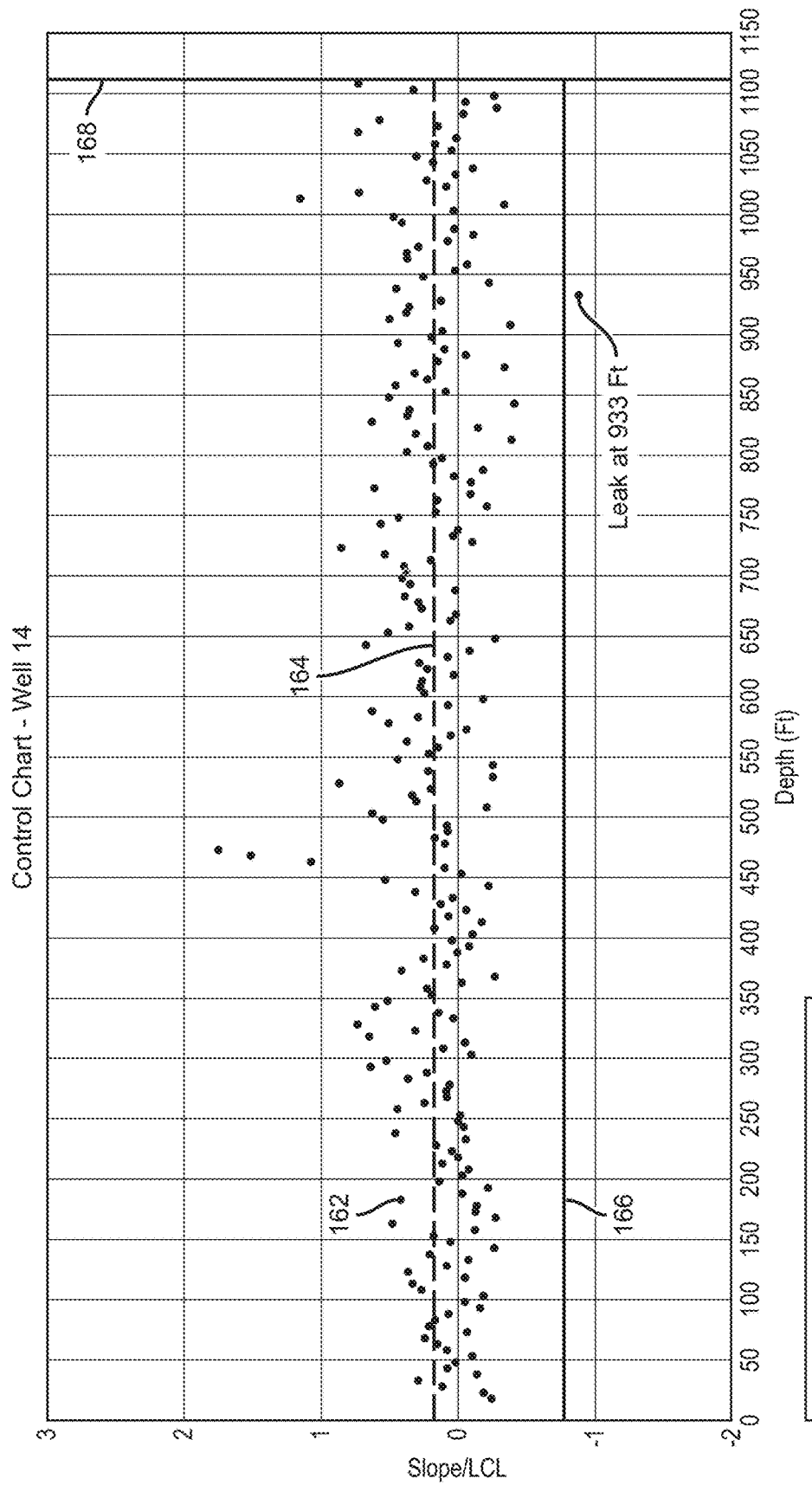
FIG. 21C is a control chart generated from the data used to generate stabilized temperature profile 160 of Well 14.

Well 6, having three known leaks, was used to vary the multiplier to determine how the accuracy of the analysis would change. Calculations were made using a multiplier of 2.0 and 5.0 which are illustrated in FIG. 13D and FIG. 13E respectively. The control chart shown in FIG. 13C using M=3.0 correctly identified the 3 known leaks in Well 6 above the perforated reservoir. However, the use of M=2.0 illustrated in FIG. 13D identified three additional false locations of casing leaks at 772 ft, 838 ft and 1200 ft. The use of M=5.0 illustrated in FIG. 13E identified a single leak at 1250 ft. Accuracy of the results were detrimentally affected when the multiplier exceeded the range of between 2.6-3.1.

Hole depths were then verified using the disclosure described herein with the results provided in FIG. 1 which includes the temperature drop measured across each hole. Referring again to FIG. 4, FO-DTS cable 192 obtains temperature-depth data 190 which is acquired in real time during inert gas injection. Distributed temperature measurements or temperature-depth data 190 can also be transmitted either by cable or wirelessly to a computer 200.

The method and system disclosed herein were able to accurately identify the respective depths of all twenty-two holes. No leaks were identified for Wells 10-12 since these wells had no holes or casing damage above the reservoir zone.

FIGS. 17A, 18A, 19A, 20A and 21A are temperature-depth charts for Wells 10-14 using temperature-depth data 190 of only the stabilized temperature profile 160.

Inert gas, rather than a liquid, was selected to cool the well to a stabilized temperature profile. Specifically, for the use of nitrogen gas, the isothermal properties when compared to water, allow for an optimum uniform test pressure gradient to be built inside the wellbore from ground level/surface to the lowest test depth. An inert gas also minimizes the risk of fracturing the formation and compromising the test. The column pressure attributed to nitrogen gas is negligible and thus surface pressure readings are approximately the same as the actual downhole pressure. Nitrogen's low viscosity compared to a liquid maximizes its ability to flow through a casing hole or loose connection and leak-off through the porous media/formation surrounding the casing providing the cooling effect for leak identification. Nitrogen also provides minimal friction loss so surface pressure is representative of the pressure applied downhole.

A depth correlation process is used to ensure the fiber-optic line is measured properly to the correct depth of the well. This correlation process is well known in the art. A weight indicator is also used to closely monitor the weight of the fiber-optic cable in the well.

Another method could address wells having a portion of the temperature measurements prior to inert gas injection less than 125 deg F. for nitrogen gas or 115 deg F. for carbon dioxide gas. Such wells could be, for example, shallow, non-steam flood wells. For this situation, prior to thermally conditioning the well, it would be necessary to increase the wellbore temperature above the normal downhole temperature by using a sufficient volume of a heated liquid, preferably heated well water. The difference between the temperature requirements of nitrogen vs. carbon dioxide gas is based on the isothermal properties of carbon dioxide gas being more efficient at providing a cooling effect.

Figure 4:
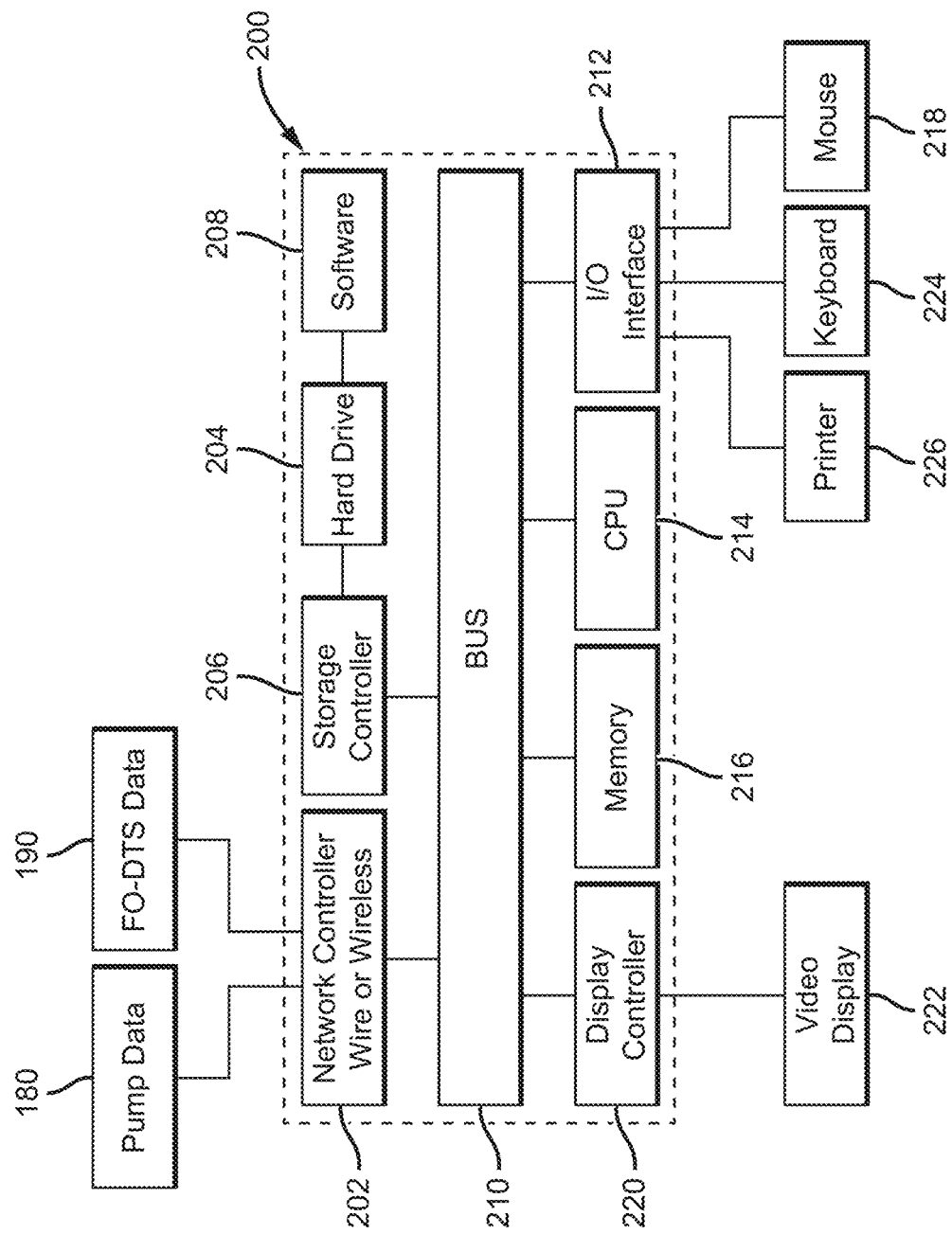
FIG. 4 illustrates one hardware environment for remote monitoring device 200 for managing the processes for leak identification.

A computer program product can be utilized for identification of casing leaks and includes a non-transitory computer readable medium containing computer instructions stored for causing a computer processor to perform the required steps. FIG. 4 illustrates one hardware environment for computer 200 for managing the processes. Temperature-depth data 190 and optionally, pump data 180 from the nitrogen gas tanker 182 are communicated to computer 200 which can be in the form of a laptop or desktop computer. Computer 200 includes a network controller 202, hard drive 204, storage controller 206, software 208, communication bus 210, I/O interface 212, CPU 214, memory 216. Peripherals such as keyboard 224, mouse 218 and printer 226 are connected to I/O interface 212. Video controller 220 is connected to video display 222.

Storage controller 206 connects hard drive 204 with communication bus 210 for interconnecting all the components of the computer. In one preferred embodiment, a spreadsheet software is used to receive temperature-depth data 190. Following the temporary stabilization of the temperature profile, the software can calculate the moving average temperature gradients, the mean, standard deviation, and a desired LCL for presentation on video display 222, printer 226 or for communicating the resultant calculations via network controller 202 to a remote location.

Figure 5A:
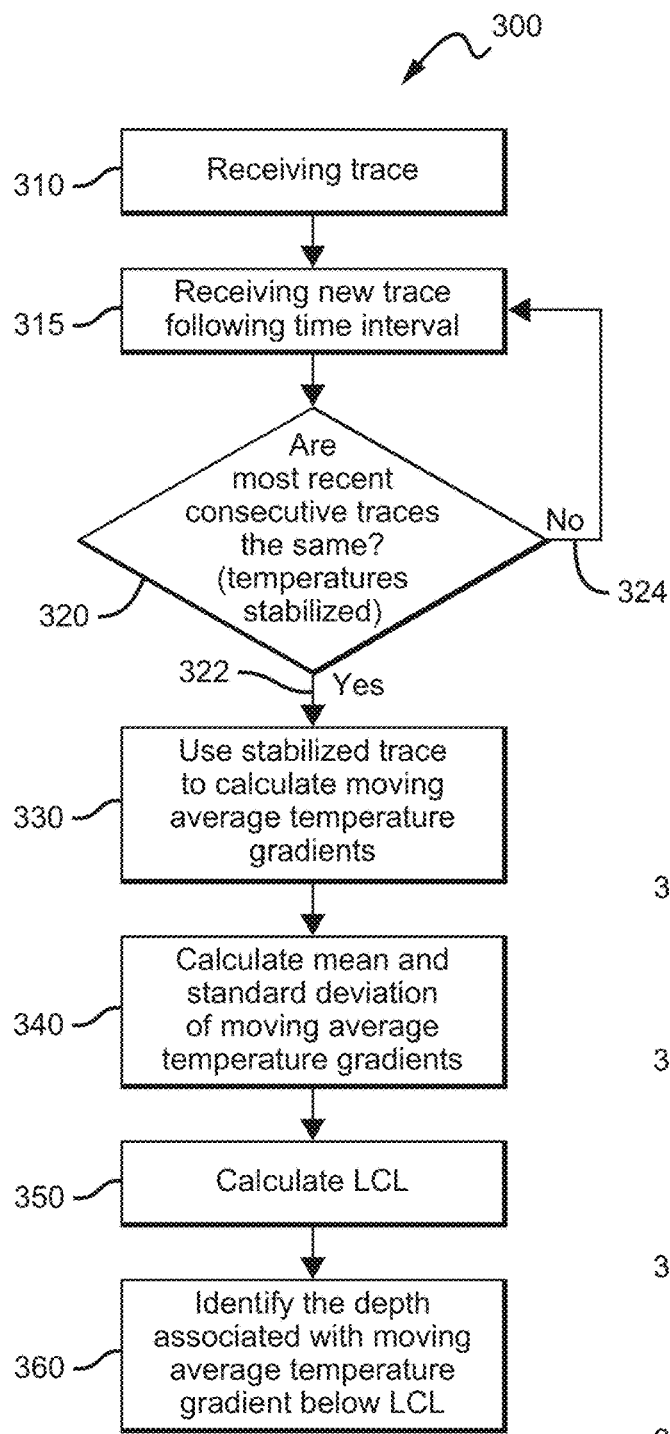
FIG. 5A shows a system 300 for the identification of the depth of a leak in a casing string.
Figure 5B:
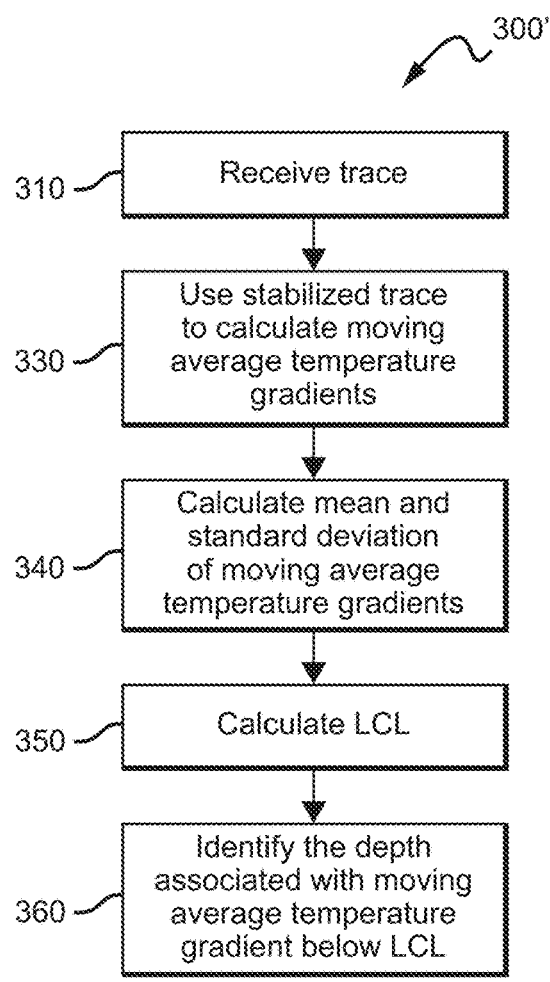
FIG. 5B shows a system 300' for the identification of the depth of a leak in a casing string.

FIG. 5A and FIG. 5B show methods 300 and 300' respectively for the identification of the depth of a leak in a casing string. FIG. 5A is for wells in which the volume of inert gas to be injected necessary to thermally condition the well is not known. At step 310, a first set of temperature-depth data 190 is received from a measurement device that monitors the temperatures in real time between surface and a lower depth. The first set can be shown graphically on video display 222 or plotted by a printer 226 as a temperature profile.

At step 315, a second set of temperature-depth data is received in real time five minutes after the first set was received.

At step 320, the consecutive sets of the most recent sets of temperature-depth data 190 are compared to determine whether the temperatures between the sets are stabilized. This was performed visually by comparing the temperature profiles of the most recent consecutive sets. If the temperatures in the most recent consecutive sets have stabilized, the well is considered thermally conditioned at step 322 and proceeds to step 330. Visual comparison can be of the respective temperature profiles of the most recent sets overlayed on one another, viewed graphically on a video display or plotted by a printer. If the temperatures of the most recent consecutive sets have not stabilized, step 324 returns the sequence back to step 315 to receive a new set of temperature-depth data after a time interval of 5 minutes.

At step 330, the stabilized temperature-depth data 190 is used to calculate a series of moving average temperature gradients per pre-determined interval, with the temperature gradient calculated every pre-determined distance. For Wells 1-14, a 5-foot moving average was used, calculated every foot.

At step 340, the mean and standard deviation of the moving average temperature gradients are calculated.

At step 350, the LCL is calculated equal to the mean minus a multiplier of the standard deviation. For Wells 1-14, a multiplier of 3.0 was used.

At step 360, identify the depth associated with a moving average temperature gradient having a value lower than the LCL which is indicative of a leak.

FIG. 5B shows a method 300' for the identification of the depth of a leak in a casing string in which a known volume of inert gas is injected to thermally condition the well. Once the volume of inert gas has been injected, at step 310, temperature-depth data 190 is received. Since the volume of gas injected has determined the thermal conditioning of the well, it is not necessary to compare consecutive sets of temperature-depth data as for method 300. From well tests conducted, the volume of inert gas injected to thermally condition a well is at least twenty times the internal volume of the casing of the well.

At step 330, the stabilized temperature-depth data 190 is used to calculate a series of moving average temperature gradients per pre-determined interval, with the temperature gradient calculated every pre-determined distance; for Wells 1-14, a 5-foot moving average was used, calculated every foot.

At step 340, the mean and standard deviation of the moving average temperature gradients are calculated.

At step 350, the LCL is calculated equal to the mean minus a 3.0 multiplier of the standard deviation.

At step 360, identify the depth associated with a moving average temperature gradient having a value lower than the LCL which is indicative of a leak.

Figure 6:
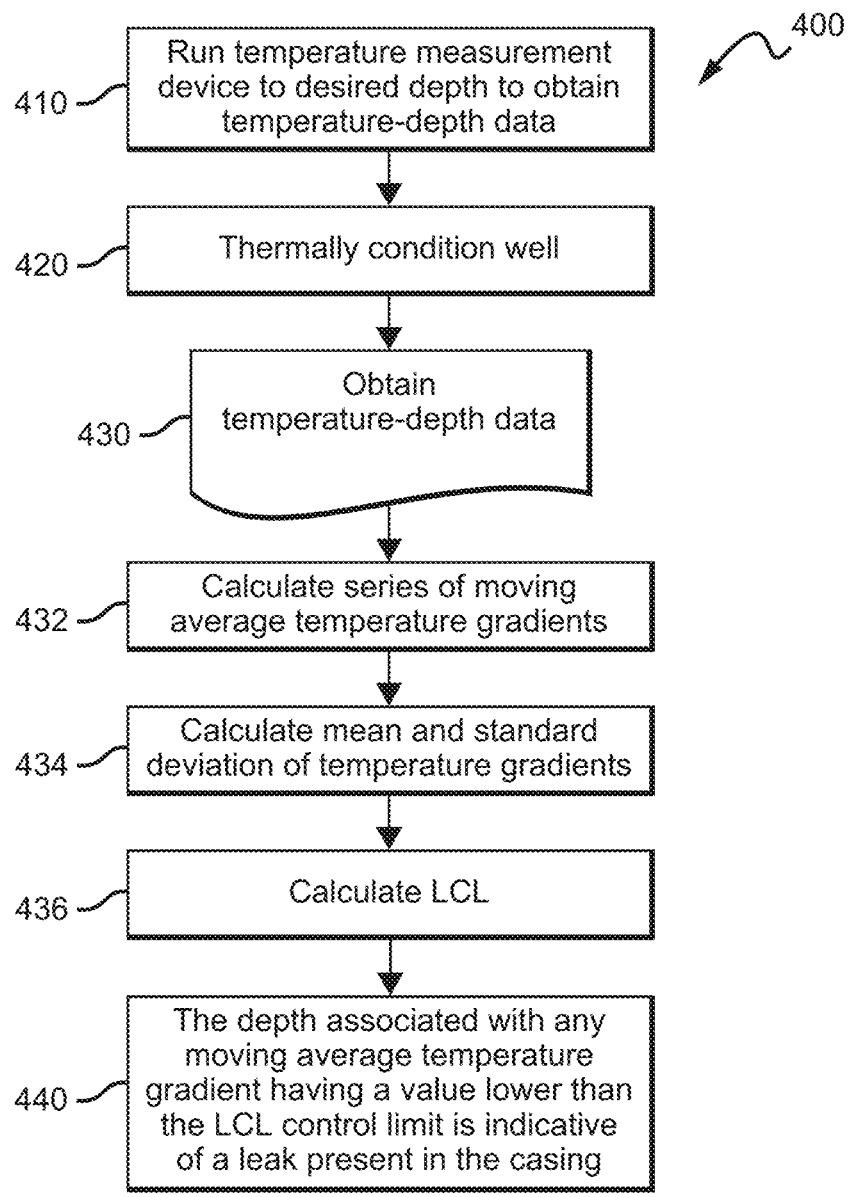
FIG. 6 shows a flow chart for a method 400 for the identification of the depth of a leak in a casing string.

FIG. 6 is a flowchart of an example method 400 for identifying one or more leaks in a casing.

At step 410, a temperature measurement device is run into the casing of a well to a desired depth to obtain temperature-depth data between two depths of the casing in real time. The upper depth is the highest point to be evaluated by the test which is usually surface.

At step 420, the well is thermally conditioned using nitrogen gas.

At step 430, after the well has been thermally conditioned, stabilized temperature-depth data 190 is obtained.

At step 432, the stabilized temperature-depth data is used to calculate a series of moving average temperature gradients. A 5-foot moving average was used and recalculated every 1 foot.

At step 434, the mean of the moving average temperature gradients and the standard deviation of the moving average temperature gradients are calculated.

At step 436, the LCL is calculated. The LCL is equal to the mean minus a multiplier of the standard deviation. The multiplier used for Wells 1-14 was 3.0.

At step 440, the depth associated with any moving average temperature gradient having a value lower than the LCL control limit is indicative of a leak present in the casing.

The invention claimed is:

1. A method for identifying one or more leaks in a casing, the method comprising steps of:
    running a temperature measurement device into the casing of a well to obtain temperature-depth data between two depths of the casing in real time;
    obtaining at least one set of temperature-depth data;
    thermally conditioning the well;
    thereafter, using a set of temperature-depth data of the thermally conditioned well to:
        a) calculate a series of temperature gradients between the two depths, with a moving average temperature gradient calculated over a window having a value between two and ten feet, recalculated at pre-determined intervals between a minimum interval that temperature measurements can be obtained by the temperature measurement device and ten feet;
        b) calculate a mean of moving average temperature gradients;
        c) calculate a standard deviation of the moving average temperature gradients;
        d) calculate a lower control limit (LCL) using a formula: LCL=X−(M×S) where X is the mean, M is a multiplier having a value between 2.6-3.1 and S is the standard deviation; and identify the one or more leaks by determining a depth associated with any moving average temperature gradient having a value lower than the lower control limit.

2. The method of claim 1, wherein thermally conditioning the well is injection of an inert gas in a sufficient volume to stabilize the temperature-depth data.

3. The method of claim 2, wherein the inert gas is selected from a group consisting of carbon dioxide gas and nitrogen gas.

4. The method of claim 3, wherein the sufficient volume is at least twenty times a volume of the casing.

5. The method of claim 3, wherein the inert gas is injected down the casing and into a reservoir having a known fracture pressure at a surface pumping pressure varying no more than +/−3 percent and below a fracture pressure of the reservoir.

6. The method of claim 1, wherein the pre-determined intervals comprise one-foot intervals.

7. The method of claim 6, wherein the series of temperature gradients are calculated using a moving average f between four feet and six feet.

8. The method of claim 7, wherein the series of temperature gradients are calculated using the moving average of five feet.

9. The method of claim 1, wherein thermally conditioning the well is determined by no further cooling observed in consecutive traces.

10. The method of claim 1 further comprising a step of displaying the lower control limit and the series of moving average temperature gradients in a control chart.

11. A method for identifying a depth of a leak in a casing string of a well of a steam flood, the method comprising steps of:

running a fiber-optic distributed temperature sensing (FO-DTS) cable into the casing string of the well to obtain more than one trace along the casing string between two depths;

pumping a volume of inert gas down the casing string to displace all preceding liquids and gases from the casing string;

continue pumping the inert gas at a stabilized surface pressure until no further cooling is observed when comparing consecutive traces;

thereafter, using a trace for calculating a series of five-foot moving average temperature gradients between the two depths recalculated every one-foot;

calculating a mean of the series of five-foot moving average temperature gradients;

calculating a standard deviation of the series of five-foot moving average temperature gradients;

calculating a lower control limit (LCL) defined as: LCL=X−(M×S) where X is the mean, M is a multiplier having a value between 2.6-3.1 and S is the standard deviation; and identify the leak by determining a depth of any moving average temperature gradient having a value lower than the lower control limit.

12. The method of claim 11, wherein the inert gas is selected from a group consisting of carbon dioxide gas and nitrogen gas.

13. The method of claim 12, wherein a volume of the inert gas is at least twenty times a casing volume measured from a surface to a lower casing depth.

14. The method of claim 11, wherein a volume of the inert gas is at least twenty times a casing volume measured from a surface to a lower casing depth.

15. A method for identifying damage to a casing string of a well having perforations for fluid communication with a reservoir, the method comprising steps of:

positioning a fiber-optic distributed temperature sensing (FO-DTS) cable to acquire a trace between a lower depth and a shallow depth;

pumping a sufficient volume of inert gas into the well below a fracture pressure of the reservoir at a constant pumping pressure varying no more than +/−3 percent to temporarily stabilize temperatures between the lower depth and the shallow depth;

thereafter, acquiring the trace; and determining a depth of any damage present in the casing string using the trace.

16. The method of claim 15, wherein the lower depth is above a depth of the perforations.

17. The method of claim 15, wherein the step of determining the depth of any damage present in the casing string using the trace comprises:

calculating a series of moving average temperature gradients between the lower depth and the shallow depth calculated at pre-determined intervals;

calculating a mean of the series of moving average temperature gradients;

calculating a standard deviation of the series of moving average temperature gradients;

calculating a lower control limit (LCL) defined as: LCL=X−(M× S) where X is the mean, M is a multiplier having a value between 2.0-3.1 and S is the standard deviation; and determining a depth associated with any moving average temperature gradient having a value lower than the lower control limit.

18. The method of claim 17, wherein the lower depth is above a depth of the perforations.

19. The method of claim 17, wherein the series of moving average temperature gradients use a moving average calculated over a window having a value between two and ten feet, recalculated at one-foot intervals.

20. The method of claim 19, wherein the lower depth is above a depth of the perforations.

21. The method of claim 19, wherein the series of moving average temperature gradients are calculated using the moving average of five feet.

22. The method of claim 17, wherein a volume of the inert gas is at least twenty times a casing volume measured from a surface to the lower depth.

23. The method of claim 17 further comprising a step of displaying the lower control limit and the series of moving average temperature gradients in a control chart.

24. A method for identifying one or more leaks in a casing string, the method comprising steps of:

running a temperature measurement device into the casing string to measure temperatures between two depths of the casing string;

injecting a volume of inert gas into the casing string to cool and temporarily stabilize the temperatures between the two depths;

thereafter, obtaining temperature-depth data between the two depths in real time;

using the temperature-depth data for calculating a series of temperature gradients with a moving average calculated over a window having a value between four and six feet recalculated every one foot;

calculating a mean of the series of moving average temperature gradients;

calculating a mean of a series of moving average temperature gradients;

calculating a lower control limit (LCL) defined as: LCL=X−(M×S) where X is the mean, M is a multiplier having a value between 2.6-3.1 and S is the standard deviation; and identify the one or more leaks by determining a depth associated with any moving average temperature gradient having a value lower than the lower control limit.

25. The method of claim 24 wherein the inert gas is selected from a group consisting of carbon dioxide gas and nitrogen gas.

26. The method of claim 25, wherein the series of temperature gradients are calculated using the moving average of five feet.

27. The method of claim 25, wherein the volume of the inert gas is at least twenty times a casing volume measured from a surface to a lower casing depth.

28. The method of claim 27, wherein the series of temperature gradients are calculated using the moving average of five feet.

29. The method of claim 25 further comprising a step of displaying the lower control limit and the series of moving average temperature gradients in a control chart.

* * * * *